US011472437B2

(12) United States Patent
Suzuki et al.

(10) Patent No.: US 11,472,437 B2
(45) Date of Patent: Oct. 18, 2022

(54) VEHICLE AND PROGRAM FOR VEHICLE FOR RESPONDING TO INQUIRY TO USAGE APPLICATION

(71) Applicant: MicoLatta Inc., Tokyo (JP)

(72) Inventors: Masahiro Suzuki, Tokyo (JP); Mayumi Suzuki, Tokyo (JP); Yoichiro Sako, Tokyo (JP)

(73) Assignee: MICOLATTA INC., Tokyo (JP)

( * ) Notice: Subject to any disclaimer, the term of this patent is extended or adjusted under 35 U.S.C. 154(b) by 116 days.

(21) Appl. No.: 16/641,875

(22) PCT Filed: Sep. 5, 2017

(86) PCT No.: PCT/JP2017/031926
§ 371 (c)(1),
(2) Date: Feb. 25, 2020

(87) PCT Pub. No.: WO2019/049201
PCT Pub. Date: Mar. 14, 2019

(65) Prior Publication Data
US 2020/0198658 A1 Jun. 25, 2020

(51) Int. Cl.
*B60W 60/00* (2020.01)
*B60W 10/30* (2006.01)
(Continued)

(52) U.S. Cl.
CPC ........ *B60W 60/0013* (2020.02); *B60W 10/30* (2013.01); *G01C 21/3484* (2013.01); *G05D 1/0217* (2013.01); *G05D 2201/0212* (2013.01)

(58) Field of Classification Search
CPC .............. B60W 60/0013; B60W 10/30; G01C 21/3484; G05D 1/0217; G05D 2201/0212
See application file for complete search history.

(56) References Cited

U.S. PATENT DOCUMENTS

2006/0184800 A1* 8/2006 Rosenberg ............... G07C 9/37
713/186
2009/0247151 A1* 10/2009 Kameyama ............ H04L 67/22
455/426.1
(Continued)

FOREIGN PATENT DOCUMENTS

JP 11-295080 10/1999
JP 2012-150045 8/2012
(Continued)

OTHER PUBLICATIONS

English Translation of JP 2012150045 A Author: Miura et al. Title: Spot Guidance Device and Spot Guidance Method Date: Aug. 9, 2012 (Year: 2012).*
(Continued)

*Primary Examiner* — Brian P Sweeney
*Assistant Examiner* — Steven Vu Nguyen
(74) *Attorney, Agent, or Firm* — Greenblum & Bernstein, P.L.C.

(57) ABSTRACT

A vehicle includes: a traveling driving system configured to execute traveling of an own vehicle; a non-traveling-application providing unit configured to provide a passenger with an application other than the traveling of the own vehicle; and a control unit. The control unit includes: inquiry means for inquiring a usage application of the own vehicle to the passenger when it is detected that the passenger gets into the own vehicle, the usage application including a traveling application and the application other than traveling of the own vehicle; non-traveling-application providing unit activating means for activating the non-traveling-application providing unit in a case where the application other than traveling is selected in response to the inquiry by the inquiry means; and traveling driving system activating means for activating the traveling driving system in a case where the
(Continued)

traveling application is selected in response to the inquiry by the inquiry means.

16 Claims, 14 Drawing Sheets

(51) Int. Cl.
   *G01C 21/34* (2006.01)
   *G05D 1/02* (2020.01)

(56) References Cited

U.S. PATENT DOCUMENTS

| | | | |
|---|---|---|---|
| 2012/0229505 | A1 | 9/2012 | Kuga |
| 2015/0142305 | A1* | 5/2015 | Kubo ............... B60L 1/003 |
| | | | 701/439 |
| 2015/0206512 | A1 | 7/2015 | Kuga |
| 2017/0153685 | A1* | 6/2017 | Li ..................... G06F 1/30 |
| 2017/0282717 | A1* | 10/2017 | Jang ............... G06F 3/04817 |
| 2018/0329910 | A1* | 11/2018 | Coburn ............... G06Q 10/10 |
| 2019/0035272 | A1* | 1/2019 | Roelle ............... B60W 50/14 |
| 2019/0051306 | A1* | 2/2019 | Torama ............... G06F 3/167 |

FOREIGN PATENT DOCUMENTS

| | | |
|---|---|---|
| JP | 2013-148946 | 8/2013 |
| JP | 2017-071237 | 4/2017 |
| JP | 2017-116341 | 6/2017 |
| WO | 2011/065113 | 6/2011 |

OTHER PUBLICATIONS

English Translation of CN 103991419 A Author: Macneille et al. Title: Method and System for Selecting Driver Preferences Date: Aug. 20, 2014 (Year: 2014).*

English Translation of JP 2017116341 A Author: Isaji et al. Title: Cruise Control Device Date: Jun. 29, 2017 (Year: 2017).*

English Translation of CN 105300398 A Author: Zhang et al. Title: Method, Device and System for Acquiring Site Information Date: Feb. 3, 2016 (Year: 2016).*

English Translation of JP 2015186944 A Author: Kidooshi et al. Title: Automatically Travelling Mobile that Provides Notification of Vehicle State and Vehicle State Notification Method Date: Oct. 29, 2015 (Year: 2015).*

English Translation of JP 2015118438 A Author: Sako et al. Title: Automatic Driving Car Date: Jun. 25, 2015 (Year: 2015).*

English Translation of Publication KR 2013-0073068 A Author: Kim Yong Kwang Title: Device and Method of Setting Destination based on Time Date: Mar. 7, 2013 (Year: 2013).*

English Translation of Publication JP2012123835A Author: Taguchi Koji Title: Cruise Control Device Date: Jun. 28, 2012 (Year: 2012).*

International Search Report issued in International Patent Appl. No. PCT/JP2017/031926, dated Nov. 21, 2017.

Written Opinion of the International Searching Authority issued in International Pat. Appl. No. PCT/JP2017/031926, dated Nov. 21, 2017.

"Japanese version of Newsweek", Oct. 18, 2016, pp. 21-30.

Erin Biba, "What the World Will Look Like Without Drivers", Newsweek, Jan. 14, 2016, pp. 1-9, available at https://www.newsweek.eom/2016/01/22/driverless-cars-and-future-getting-around-415405.html.

Nidhi Kalra, "When Will We Know Self-Driving Cars Are Safe?", Newsweek, Sep. 24, 2016, pp. 1-3, available at https://www.newsweek.com/when-will-we-know-self-driving-cars-are-safe-501270.

Henry Grabar, "Do Driverless Cars Favor Urban or Suburban Life?", Slate, Sep. 29, 2016, pp. 1-2, available at https://slate.com/technology/2016/09/are-driverless-cars-better-for-cities-or-suburbs.html.

* cited by examiner

FIG. 2

| USER NAME | TANAKA XX | USER ID | ID1 | | |
|---|---|---|---|---|---|
| USAGE HISTORY ||||||
| DATE (DAY OF WEEK) | APPLICATION TYPE | APPLICATION CONTENT | APPLICATION DETAILS | USAGE TIME |
| 2017.1.3 (TUE) | OTHER THAN TRAVELING | AV/GAME RELATION | MUSIC REPRODUCTION | 12:00—13:00 |
| 2017.1.4 (WED) | TRAVELING: AUTOMATIC | DESTINATION UNDETERMINED | RETURN BY 30 MIN. | 09:00—09:30 |
| 2017.1.5 (THU) | TRAVELING: AUTOMATIC | DESTINATION KNOWN | HOME TO XY STATION | 07:00—07:20 |
| 2017.1.5 (THU) | TRAVELING: AUTOMATIC | DESTINATION KNOWN | XY STATION TO HOME | 18:30—18:45 |
| 2017.1.6 (FRI) | TRAVELING: AUTOMATIC | DESTINATION KNOWN | HOME TO XY STATION | 07:00—07:21 |
| 2017.1.6 (FRI) | TRAVELING: AUTOMATIC | DESTINATION KNOWN | XY STATION TO HOME | 18:28—18:45 |
| 2017.1.7 (SAT) | TRAVELING: MANUAL | DESTINATION KNOWN | HOME TO YZ STORE | 10:00—10:15 |
| 2017.1.7 (SAT) | TRAVELING: MANUAL | MASSAGE, ETC. | YZ STORE TO HOME | 11:30—11:45 |
| 2017.1.7 (SAT) | OTHER THAN TRAVELING | AV/GAME RELATION | MASSAGE | 15:00—15:30 |
| 2017.1.7 (SAT) | OTHER THAN TRAVELING | DESTINATION UNDETERMINED | GAME | 17:00—17:30 |
| 2017.1.8 (SUN) | TRAVELING: AUTOMATIC | | TO NEARBY SEA | 10:00—11:00 |
| ... | ... | ... | ... | ... |

| USER NAME | TANAKA YY | USER ID | ID2 | | |
|---|---|---|---|---|---|
| USAGE HISTORY ||||||
| DATE (DAY OF WEEK) | APPLICATION TYPE | APPLICATION CONTENT | APPLICATION DETAILS | USAGE TIME |
| ... | ... | ... | ... | ... |

You always travels to XX station
by the automatic driving at this time, and
do you execute it today?

⦿ EXECUTE

◯ NOT EXECUTE (B)

111D

You always utilize a massage
at this time, and
do you utilize it today?

◯ EXECUTE

⦿ NOT EXECUTE

VEHICLE AND PROGRAM FOR VEHICLE FOR RESPONDING TO INQUIRY TO USAGE APPLICATION

TECHNICAL FIELD OF THE INVENTION

This invention relates to a vehicle and a program for the vehicle.

BACKGROUND ART OF THE INVENTION

A vehicle mainly has an object of traveling. The vehicle generally first receives an activation operation by a passenger to apply a power source voltage to a traveling driving system as a main component from a battery mounted on the vehicle and then become a traveling startable state. In addition, the power source voltage is also applied to accessory functioning units such as a car audio unit or a car navigation unit to cause these accessory functioning units to become a usable state. In other words, in a conventional vehicle, a passenger first carries out an activation operation for a traveling application after the passenger gets into the vehicle. Then, after a power source is turned on by the activation operation, the passenger carries out detailed settings for each of the accessory functioning units, for example, settings of a music source to be reproduced by each of the car audio unit or settings of a destination using the car navigation unit.

Here, accessory functions each of which is an application other than traveling of a recent vehicle include a massage function (see Patent document 1) and the like in addition to a television viewing function and a DVD reproducing and viewing function, for example, and are mounted on the vehicle. A possibility to mount a wide variety of applications other than traveling thereon is increasing.

Further, in recent years, development of a vehicle provided with an automatic driving mode in which autonomous traveling is allowed even though a driver does not carry out a manual driving operation has been advanced. In the future, it is expected that a fully automatic driving vehicle, which does not require the manual driving operation by the driver at all, appears (see Non-Patent document 1). Appearance of such a vehicle (automatic driving vehicle) provided with the automatic driving mode causes a passenger to be freed from the driving operation.

In cooperation with the appearance of such an automatic driving vehicle, it is expected that a possibility to utilize an accessory function, which can be used in a vehicle interior regardless of traveling of a vehicle, even when the vehicle does not travel but is stopping, is increased.

PRIOR ART DOCUMENTS

Patent Documents

Patent document 1: JP2017-071237

NON-PATENT DOCUMENTS

Non-patent document 1: A magazine "Japanese version of Newsweek", issued on Oct. 18, 2016, pages 21-30

SUMMARY OF THE INVENTION

Problems to be Solved by Invention

From the background as described above, it is thought that a usage application of a vehicle is not limited to a traveling application, but utilizes, as a non-traveling application (application other than traveling), the interior of the vehicle for a space for enjoying audio, a space for enjoying AV viewing by reproducing a television or a DVD, a space for enjoying a game, a space for receiving a massage, or a space for getting a rest in a silent manner such as sleeping.

In view of such a background, a non-traveling application exists in addition to a traveling application of an own vehicle as a usage application of a passenger. Therefore, a situation that even when the passenger gets into the vehicle, the passenger is not allowed to select or set an accessory function unless the passenger carries out an activation operation and applies a power source voltage to a traveling driving system to activate it like a conventional manner is very inconvenient. The power source supply to the traveling driving system by the activation operation may go in vain.

It is an object of this invention to provide a vehicle by which the problem as described above is solved.

Means for Solving the Problems

In order to solve the problem described above, the present invention defined in claim 1 provides a vehicle that includes: a traveling driving system configured to execute traveling of an own vehicle; a non-traveling-application providing unit configured to provide a passenger with an application other than traveling of the own vehicle; and a control unit, wherein the control unit includes: inquiry means for inquiring a usage application of the own vehicle to the passenger when it is detected that the passenger gets into the own vehicle, the usage application including a traveling application and the application other than traveling of the own vehicle; non-traveling-application providing unit activating means for activating the non-traveling-application providing unit in a case where the application other than traveling is selected in response to the inquiry by the inquiry means; and traveling driving system activating means for waiting for an activation instruction from the passenger to activate the traveling driving system in a case where the traveling application is selected in response to the inquiry by the inquiry means.

According to the invention defined in claim 1 having the configuration described above, when the passenger gets into the vehicle, the control unit of the vehicle inquires of the passenger whether the usage application that the passenger wants to execute is the traveling application or the application other than traveling, and obtains its response.

Then, in a case where the application other than traveling is selected in response to the inquiry, the control unit activates the non-traveling-application providing unit. Further, in a case where the traveling application is selected in response to the inquiry, the control unit waits for the activation instruction from the passenger to activate the traveling driving system.

Effect According to the Invention

According to the vehicle of this invention, before an own vehicle is activated, a passenger is always confirmed whether a usage application by the passenger is a traveling application or an application other than traveling. Therefore, in accordance with the selection of the usage application, it is possible to supply a power source to a proper place of the own vehicle to activate it. Then, since the passenger can make a suitable instruction according to his or her application on the basis of an inquiry from a vehicle, the vehicle has very good usability.

BRIEF EXPLANATION OF THE DRAWINGS

FIG. 2 is a view illustrating an example of history content in a history memory included in the electronic control circuit unit of the automatic driving vehicle in the example of FIG. 1.

FIG. 12 is a view illustrating a display example for explaining an example of a processing operation by the electronic control circuit unit of the automatic driving vehicle in the example of FIG. 1.

EMBODIMENTS FOR CARRYING OUT THE INVENTION

Figure 1:
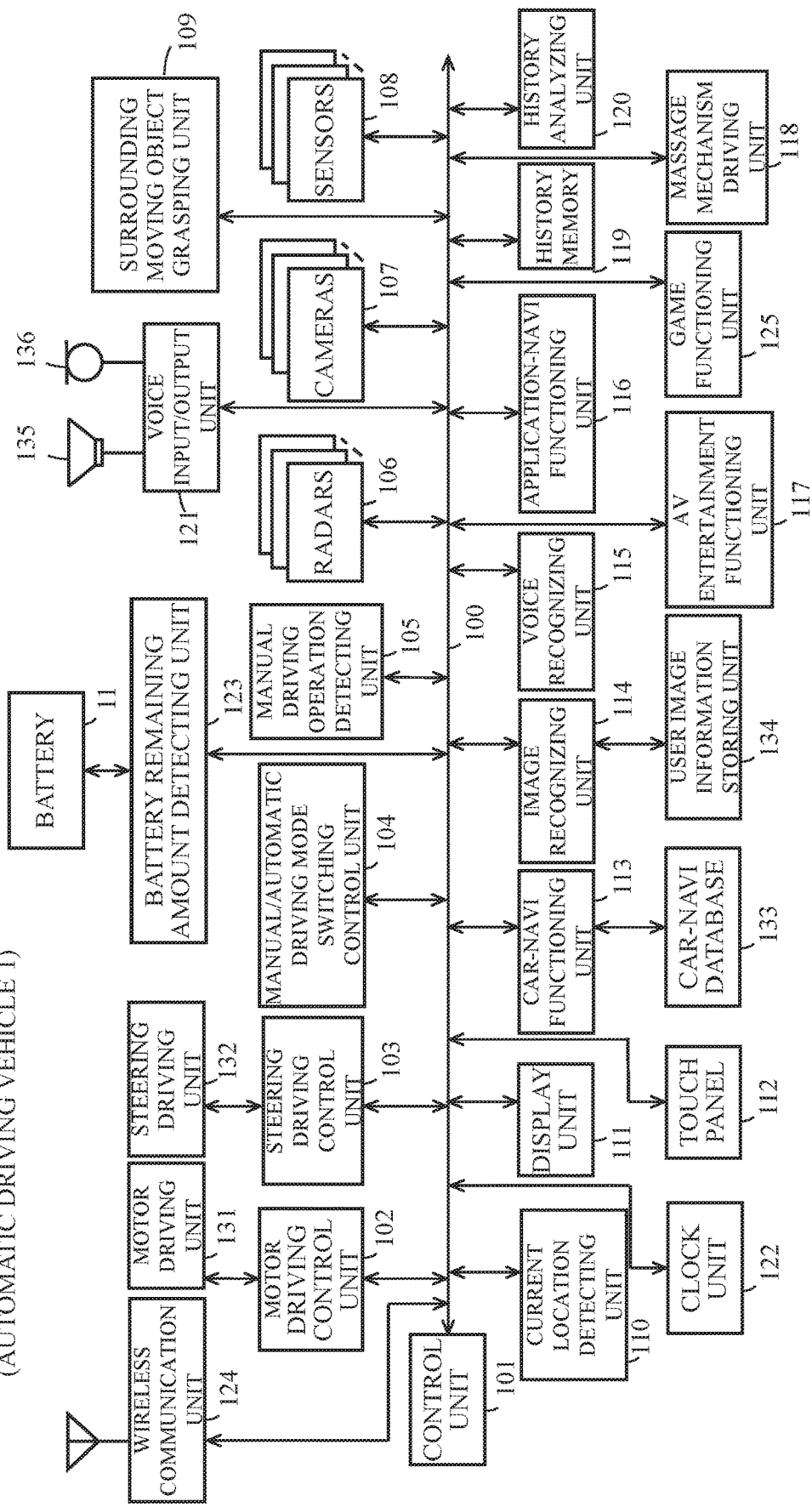
FIG. 1 is a view illustrating an example of a configuration of an electronic control circuit unit in an automatic driving vehicle according to an embodiment of a vehicle by this invention.
Figure 3:
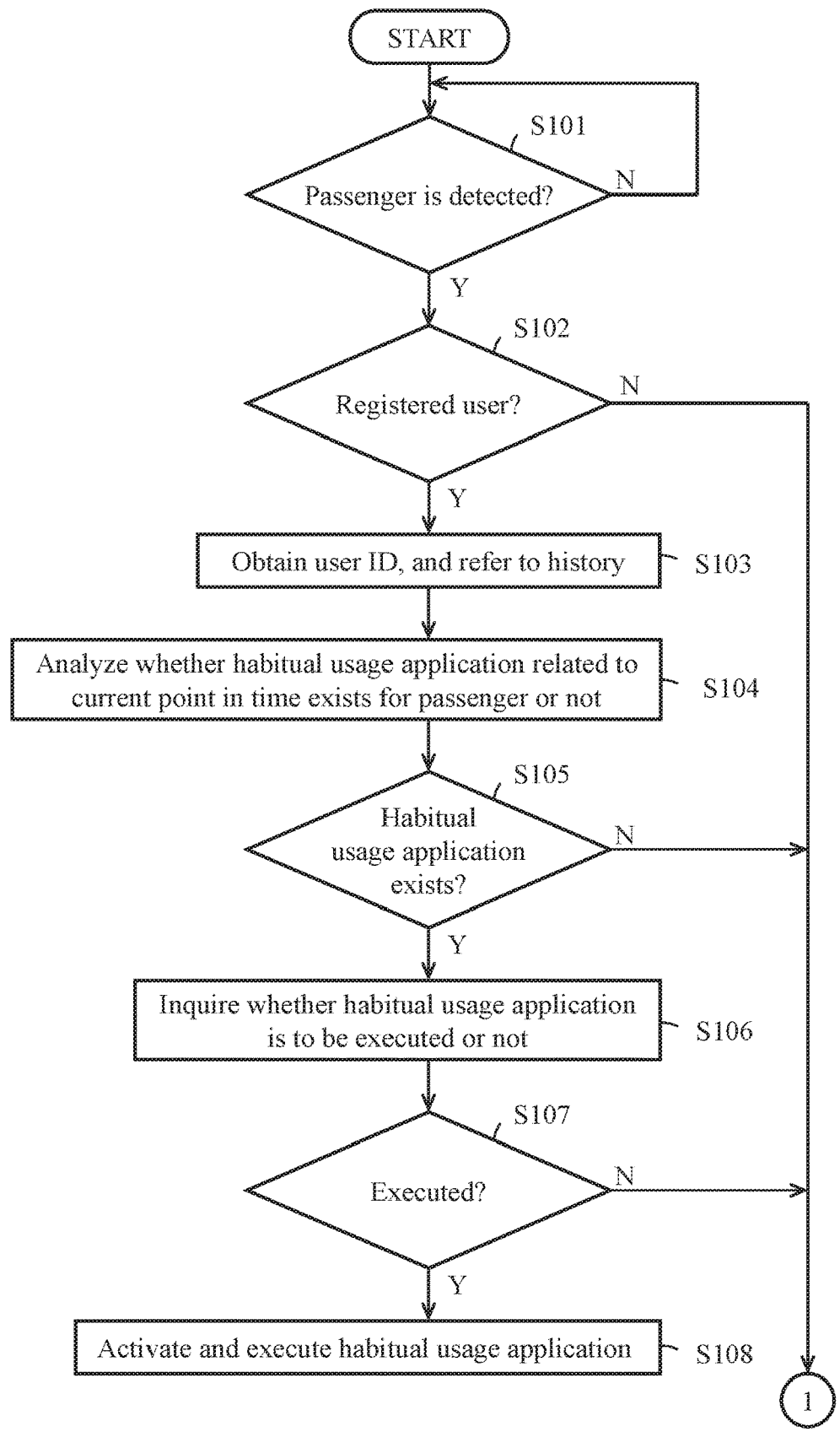
FIG. 3 is a view illustrating a flowchart for explaining a part of a flow of an example of a processing operation by the electronic control circuit unit of the automatic driving vehicle in the example of FIG. 1.

Hereinafter, a vehicle according to an embodiment of this invention will be described with reference to the drawings.

A vehicle according to a first embodiment, which will be described below, is a vehicle (that is, an automatic driving vehicle) provided with a manual driving mode and an automatic driving mode. In the manual driving mode, similarly to a conventional vehicle, traveling of the vehicle is carried out in accordance with a manual driving operation by a driver. In the automatic driving mode, autonomous traveling is carried out regardless of a driving operation by the driver. This invention can of course be realized even by a vehicle provided with only an automatic driving mode (that is, a fully automatic driving vehicle). In the automatic driving mode, the manual driving operation by the driver is not required completely (that is, the manual driving operation cannot be carried out), and the autonomous traveling is carried out.

In an automatic driving vehicle according to the embodiment, which will be described below, the following points are considered particularly. Namely, in a case where a fully automatic driving vehicle that does not require a manual driving operation by a driver completely is considered without considering an application other than traveling, it is unclear what route the vehicle is traveling on unless a destination is set. For this reason, a setting of a destination is necessary required after activation. However, in a conventional procedure, the passenger is required to carry out an operation to set a destination by using a car navigation unit after the activation operation, whereby this is troublesome. The automatic driving vehicle according to the embodiment below improves this point.

Further, in the automatic driving vehicle that includes the manual driving mode capable of a similar driving operation to the conventional vehicle in addition to the automatic driving mode, settings of a destination are not required in case of causing an own vehicle to travel in the manual driving mode and using no car navigation unit. However, while traveling in the manual driving mode, the own vehicle may switch into the automatic driving mode for some reason such as reason why the driver wants to carry out an operation other than driving for a while.

Further, as a function of the automatic driving vehicle, the driver may forcibly switch from the manual driving mode to the automatic driving mode to secure traffic safety (for example, in a case where a pedestrian exists on a pedestrian crossing, the driver forcibly switches into the automatic driving mode to temporarily stop the automatic driving vehicle, or the driver forcibly switches into the automatic driving mode when a doze or drunken driving of the driver is detected). In such a case, when the destination is not set in advance, the vehicle cannot know or determine, by the automatic driving mode, which route the vehicle is to travel. The automatic driving vehicle according to the embodiment below also solve this problem.

FIG. 1 is a block diagram illustrating an example of a hardware configuration of an electronic control circuit unit 10 in an automatic driving vehicle 1 according to the first embodiment. In this regard, the automatic driving vehicle 1 according to this embodiment is an example of a case of an electric vehicle, and mounts a battery 11 as a driving source thereon.

Further, the automatic driving vehicle 1 according to this embodiment includes a manual driving mode and an automatic driving mode. The manual driving mode is a mode in which the automatic driving vehicle 1 can travel in accordance with an accelerator pedal operation, a brake pedal operation, a shift lever operation, or a steering operation (or a handle operation) by the driver as well as a normal vehicle that is not an automatic driving vehicle.

Further, the automatic driving mode is a traveling mode in which the automatic driving vehicle 1 itself automatically (or autonomously) changes courses while avoiding an obstacle even though the driver does not carry out any of the accelerator pedal operation, the brake pedal operation, and the shift lever operation and the steering operation, and is a mode that is automatically switched into the manual driving mode on the basis of predetermined behavior by the driver. Here, the predetermined behavior by the driver includes a predetermined operation such as a driving operation by the driver, an operation input through a touch panel (will be described later) by the driver, and behavior of a voice input by the driver.

For example, the driver of the automatic driving vehicle 1 can switch the automatic driving vehicle 1 while traveling in the manual driving mode into a normal automatic driving mode by means of a predetermined operation via a touch panel 112 (will be described later). The automatic driving vehicle 1 is configured to so as to automatically return to the manual driving mode when the driver carries out an operation such as the accelerator pedal operation, the brake pedal operation, the shift lever operation, or the steering operation while traveling in the normal automatic driving mode.

In this regard, the automatic driving vehicle 1 is the same as the automatic driving mode described above in that autonomous automatic driving is executed. However, the automatic driving vehicle 1 may be provided with a forcible automatic driving mode in which the automatic driving mode is not switched into the manual driving mode even in a case where predetermined behavior by the driver is detected. For example, when a predetermined switching condition defined in advance is satisfied, the automatic driving vehicle controls to switch from the manual driving mode or the normal automatic driving mode to this forcible automatic driving mode. After a situation that a release condition defined in advance is satisfied becomes, the automatic driving vehicle 1 controls to switch from the forcible automatic driving mode to the manual driving mode or the normal automatic driving mode. Any driving operation from the driver is set to invalid during this forcible automatic driving mode. Further, with respect to switching from the other mode to the forcible automatic driving mode and release of the forcible automatic driving mode, behavior of the driver is set to invalid, the automatic driving vehicle 1 is controlled by itself.

As an example of the predetermined switching condition described above, for example, it is cited a case where a pedestrian is detected to exist on a pedestrian crossing. In such a case, the automatic driving vehicle 1 is switched into the forcible automatic driving mode and temporarily stops. Further, as another example of the switching condition, it is cited a case where a doze or drunken driving of the driver is detected. In such a case, the automatic driving vehicle 1 is switched into the forcible automatic driving mode. In a case where a destination is set, the automatic driving vehicle 1 is controlled to travel toward the destination by means of the automatic driving. In a case where any destination is not set, the automatic driving vehicle 1 stops on shoulder of the road by means of the automatic driving, for example.

As illustrated in FIG. 1, in the electronic control circuit unit 10, each of a motor driving control unit 102, a steering driving control unit 103, a manual/automatic driving mode switching control unit 104, a manual driving operation detecting unit 105, a group of radars 106, a group of cameras 107, a group of sensors 108, a surrounding moving object grasping unit 109, a current location detecting unit 110, a display unit 111, a touch panel 112, a car navigation (hereinafter, abbreviated to "car-navi") functioning unit 113, an image recognizing unit 114, a voice recognizing unit 115, an application navigation (hereinafter, abbreviated to "application-navi") functioning unit 116, an AV (Audio-Visual) entertainment functioning unit 117, a massage mechanism driving unit 118, a history memory 119, a history analyzing unit 120, a voice input/output unit 121, a clock unit 122, a battery remaining amount detecting unit 123, a wireless communication unit 124, and a game functioning unit 125 is connected through a system bus 100 to a control unit 101 that is configured to mount a computer therein.

A motor driving unit 131 is connected to the motor driving control unit 102. A steering driving unit 132 is connected to the steering driving control unit 103. Further, a car-navi database 133 is connected to the car-navi functioning unit 113. Further, a user image information storing unit 134 is connected to the image recognizing unit 114. Moreover, a speaker 135 and a microphone 136 are connected to the voice input/output unit 121.

The motor driving control unit 102 is configured to control a supply of a driving signal to the motor driving unit 131 of the automatic driving vehicle 1, which is configured by the electric vehicle according to this embodiment, under a control of the control unit 101, and control traveling start, traveling speed control (including a brake control and an accelerator control), traveling stop and the like of the automatic driving vehicle 1.

The steering driving control unit 103 is configured to control, under a control of the control unit 101, a supply of a driving control signal to the steering driving unit 132 of the automatic driving vehicle 1 according to this embodiment, and control change in routes of the automatic driving vehicle 1.

The manual/automatic driving mode switching control unit 104 is configured to execute a control to switch a driving mode of the automatic driving vehicle 1 into any of the manual driving mode and the automatic driving mode in response to a selection operation input through the touch panel 112. Further, in a case where predetermined behavior by the driver, in this example, a manual driving operation (will be described later) is detected in the automatic driving mode, the manual/automatic driving mode switching control unit 104 executes a control to switch the driving mode into the manual driving mode.

In this regard, an input that becomes a trigger by which the manual/automatic driving mode switching control unit 104 executes the control to switch the driving mode of the automatic driving vehicle 1 into any of the manual driving mode and the automatic driving mode is not limited to the selection operation input through the touch panel 112, but may be a voice input of a switching instruction through the microphone 136. In case of the voice input, the voice recognizing unit 115 recognizes the voice input of the switching instruction through the microphone 136, and supplies a recognition result thereof to the manual/automatic driving mode switching control unit 104. The manual/automatic driving mode switching control unit 104 executes the switching of the driving mode on the basis of the received recognition result of the voice.

The manual driving operation detecting unit 105 is configured to receive operation information on the steering operation in addition to the accelerator pedal operation, the brake pedal operation, and the shift lever operation by the driver, and supply the operation information for the manual driving to the manual/automatic driving mode switching control unit 104.

When the automatic driving vehicle 1 is in the manual driving mode, the manual/automatic driving mode switching control unit 104 supplies the operation information for the manual driving from the manual driving operation detecting unit 105 to the motor driving control unit 102 and the steering driving control unit 103, and controls the motor driving unit 131 and the steering driving unit 132 in response to the pedal operations, the shift lever operation, the steering operation (or the handle operation) by the driver.

Further, when the automatic driving vehicle 1 is in the automatic driving mode, the manual/automatic driving mode switching control unit 104 supplies, as will be described later, operation information for automatic driving, which is generated by the control unit 101 on the basis of an output of each of the group of radars 106, the group of cameras 107, the group of sensors 108, and the surrounding moving object grasping unit 109, to the motor driving control unit 102 and the steering driving control unit 103 to control driving of the motor driving unit 131 and the steering driving unit 132 on the basis of the operation information for the automatic driving, thereby executing the autonomous traveling. In this regard, in the automatic driving mode, the car-navi functioning unit 113 searches a route from a current location toward a goal (or destination) set by the driver or the like, and controls the automatic driving vehicle 1 to travel along the searched route.

Then, when the driver carries out a predetermined operation such as the accelerator pedal operation, the brake pedal operation, the shift lever operation or the steering operation (or the handle operation) in the automatic driving mode, the manual/automatic driving mode switching control unit 104 executes a mode switching control to cause the driving mode of the automatic driving vehicle 1 to automatically, return to the manual driving mode on the basis of detection information for the manual driving operation by the manual driving operation detecting unit 105.

In this regard, in case of the fully automatic driving vehicle, the automatic driving vehicle 1 merely has only the automatic driving mode. Therefore, the switching control between the manual driving mode and the automatic driving mode is not required, and the manual/automatic driving mode switching control unit 104 and the manual driving operation detecting unit 105 do not thus exist.

The group of radars 106 is ones each of which measures a distance between the automatic driving vehicle 1 and a person or an object that exists around the automatic driving vehicle 1, and is composed of one laser radar to a plurality of laser radars (officially, LIDAR (Light Detection and Ranging or Laser Imaging Detection and Ranging)), a millimeter wave radar, or the like. The laser radar is embedded in a roof or in the vicinity of bumper, for example. The millimeter wave radar is provided in the front of the vehicle and in the rear of the vehicle, for example. Both the laser radar and the millimeter wave radar may be provided, or only one of them may be provided. Further, other radars such as a micrometer wave radar may be used. Moreover, for the similar sake of the radar, a sonar (not illustrated in the drawings) may be used.

The group of cameras 107 includes: one camera to a plurality of cameras configured to shoot the interior of the automatic driving vehicle 1; and one camera to a plurality of cameras configured to shoot the surroundings of the exterior of the automatic driving vehicle 1, such as the front, the side and the rear of the automatic driving vehicle 1. The camera configured to shoot the interior of the vehicle includes a camera configured to shoot a behavior of a person who gets in the automatic driving vehicle 1 and sits on a front passenger seat or a rear passenger seat (hereinafter, referred to as a "passenger"), in addition to a camera, attached to a back mirror (or rearview mirror, a room mirror), which is installed between a driver seat and the front passenger seat, or an upper portion of a front window, for example, configured to shoot a behavior of a person who sits on the driver seat (hereinafter, referred to as a "driver").

Further, the cameras configured to shoot the surroundings of the automatic driving vehicle 1 include: two cameras (stereo camera), attached to a right side and a left side of the rearview mirror, configured to mainly shoot right front and left front of the automatic driving vehicle 1, for example; a camera, attached to a door mirror or a fender mirror of the automatic driving vehicle 1, for example, configured to shoot the right side and the left side; and a camera configured to shoot the rear side of the automatic driving vehicle 1.

The group of sensors 108 is composed of a motion sensor (or infrared sensor, for example) configured to detect a person in the vicinity of the outside of the automatic driving vehicle 1 and various kinds of sensors for obtaining information that supports the automatic driving in addition to an open/close detecting sensor configured to detect opening or closing of a door and opening or closing of a window, a sensor configured to detect wearing of a seat belt, a seating sensor (a weight sensor, for example) configured to detect whether a passenger sits on a seat such as the driver seat or the front passenger seat, and a touch sensor (capacitance sensor, for example) configured to detect whether a person touches a handle of the driver's seat. As the various kinds of sensors for obtaining information that supports the automatic driving, a vibration sensor configured to detect vibration of the vehicle or a tire, for example, a rotational speed sensor configured to detect rotational speed of the tire, a geomagnetic sensor configured to detect an azimuth, an acceleration sensor configured to detect acceleration, a gyro sensor (or a gyroscope) configured to detect an angle or an angular velocity, and the like are contained. Further, in this embodiment, a sensor configured to detect lighting of a right winker, a left winker (direction indicator) or a hazard lamp (emergency flashing lamp) is contained in the group of sensors 108.

The surrounding moving object grasping unit 109 is configured to grasp moving objects (including persons) around the own vehicle using the group of radars 106, the group of sensors 108, and shot images of the group of cameras 107. The surrounding moving object grasping unit 109 carries out a process based on a Bayesian theory or machine learning such as deep learning, for example, whereby an obstacle or a moving object around the vehicle is grasped.

The current location detecting unit 110 receives radio waves from GPS satellites, and detects a current location of the own vehicle. Since accuracy of the location detected on the basis of radio waves from the GPS satellites is low, the current location detecting unit 110 uses not only information on the current location detected by receiving the radio waves from the GPS satellites but also one sensor to plural sensors included in the group of sensors 108, the group of radars 106, the shot images of the group of cameras 107 (together with a navigation function). The current location detecting unit 110 also carries out the process based on the Bayesian theory or the machine learning such as the deep learning, for example, whereby the current location is detected and confirmed with higher accuracy.

In the automatic driving mode, the automatic driving vehicle 1 processes various kinds of information such as the location information obtained by receiving the radio waves from the GPS satellites, the group of radars 106, the group of cameras 107, and the group of sensors 108 in the current location detecting unit 110 and the surrounding moving object grasping unit 109, that is, information corresponding to information obtained from eyes and ears of a human by means of machine learning such as the Bayesian theory or the deep learning. On the basis of this, the control unit 101 carries out intellectual information processing (artificial intelligence) and control (artificial intelligence), such as change in routes of the own vehicle and avoidance of an obstacle, and generates the operation information for the automatic driving.

The display unit 111 is composed of an LCD (Liquid Crystal Display), for example. The touch panel 112 is configured so that a touch sensor capable of a touch input by a finger, a touch pen, or the like is superimposedly provided on a display screen of the display unit 111 that is composed of the LCD. A display image including a software button (including a button for character input of a keyboard) is displayed on the display screen of the display unit 111 on the basis of the control of the control unit 101. Then, when the touch panel 112 detects a touch by the finger, the touch pen, or the like on the software button displayed on the display screen, the touch panel 112 communicates the touch to the control unit 101. The control unit 101 that receives this is configured to carry out a control process corresponding to the software button.

Domestic map data and route guidance data are stored in advance in the car-navi database 133 connected to the car-navi functioning unit 113. The car-navi functioning unit 113 is a function unit for guiding the automatic driving vehicle 1 so as to help the automatic driving vehicle 1 to move to the specified destination on the basis of the map stored in the car-navi database 133 and the route guidance data. In this embodiment, the car-navi functioning unit 113 is configured so as to carry out the processes slightly different between the manual driving mode and the automatic driving mode.

Namely, in the manual driving mode, the car-navi functioning unit 113 displays an image, in which a location of the own vehicle detected and confirmed by the current location detecting unit 110 is superimposedly displayed on a map in which a route to the destination is explicitly displayed, on the display screen of the display unit 111. The car-navi functioning unit 113 moves the location of the own vehicle (current location) on the map along with movement of the own vehicle, and carries out voice guidance at a point at which a route guidance is required, such as an intersection and a junction on the route. This is similar to a normal car-navi function.

On the other hand, in the automatic driving mode, when the current location of the own vehicle is apart from the route to the destination, the car-navi functioning unit 113 notifies the control unit 101 of information on a separating direction and a distance. When the current location of the own vehicle exists on the route to the destination, the car-navi functioning unit 113 notifies the control unit 101 of change instruction information of a course direction along the route before an intersection or a junction on the route along with the movement of the own vehicle.

The control unit 101 controls the motor driving unit 131 through the motor driving control unit 102 on the basis of the information notified by the car-navi functioning unit 113, the confirmation result of the current location of the current location detecting unit 110 and the result grasped by the surrounding moving object grasping unit 109 so that the own vehicle moves through a course as instructed on the route. The control unit 101 also generates the operation information for the automatic driving for controlling the steering driving unit 132 through the steering driving control unit 103. Therefore, on the basis of the route guidance to the destination by the car-navi functioning unit 113 and the control unit 101 in the automatic driving mode, the automatic driving vehicle 1 can move to the destination even in non-passenger state.

The image recognizing unit 114 is configured to cause a camera configured to shoot a vehicle interior among the group of cameras 107 to shoot the passenger, and recognize the passenger from a shot image. Image information for specifying (or identifying) a user (for example, a family member, a member of car sharing, acquaintances, a friend, or the like) is registered and stored in advance in the user image information storing unit 134 connected to the image recognizing unit 114 so as to be associated with identification information of each user (hereinafter, referred to as a "user ID (Identification)"). The image information contains a face image of a user to be registered as a person who uses the automatic driving vehicle 1. When the passenger is a registered user, the image recognizing unit 114 recognizes each user on the basis of the image information stored in the user image information storing unit 134 from the shot image of the camera configured to shoot the vehicle interior among the group of cameras 107, and transmits the user ID to the control unit 101 as a recognition result thereof.

Further, the image recognizing unit 114 also includes a function to recognize a person who stands on a pedestrian crossing or recognize a crossing gate of a grade crossing on the basis of the shot image from the camera configured to shoot the outside of the automatic driving vehicle 1 among the group of cameras 107, thereby recognizing the grade crossing, for example. Moreover, the image recognizing unit 114 also includes a function to extract a road sign or a traffic sign from the shot image(s) of the one camera to the plurality of cameras configured to shoot the front, the sides, and the back of the outside of the automatic driving vehicle 1 among the group of cameras 107.

The voice recognizing unit 115 receives voice information on voice collected by the microphone 136 through the voice input/output unit 121, and recognizes spoken language that a talker (that is, the passenger) speaks. The control unit 101 receives this spoken language recognized by the voice recognizing unit 115 as a voice input, and recognize meaning or the content of the spoken language.

The application-navi functioning unit 116 is activated when a door sensor of the group of sensors 108 detects opening or closing of a door and the control unit 101 detects that a passenger gets into the automatic driving vehicle 1 through any camera of the group of cameras 107. When a situation that the passenger gets into the automatic driving vehicle 1 is detected, the application-navi functioning unit 116 inquires the passenger of a usage application of the automatic driving vehicle 1 before the automatic driving vehicle 1 is activated, and receives a response about the usage application from the passenger to determine the usage application.

In this case, the phrase "when a situation that the passenger gets into the automatic driving vehicle 1 is detected" means when a situation that the passenger gets into the automatic driving vehicle 1 is detected in a state where the automatic driving vehicle 1 is not activated, and basically, a first passenger in a state where no passenger exists in the vehicle is assumed. The first passenger in this case may be one person or a plurality of persons. In case of the plurality of persons, a representative thereof carries out a response of the usage application.

Further, if the vehicle is in a non-activated state, any passenger may already exist therein. In such a case, an inquiry is executed against a new passenger. In a case where a response for a new usage application is received, the newly set usage application is executed. In this regard, the automatic driving vehicle 1 may be configured so that, in a case where the usage application is set by the passenger who has already got into the vehicle and the usage application is not to be changed, by making a response that "a previous usage application is executed (without setting a new usage application)", the previous usage application can be used continuously.

In this embodiment, as examples of an application type of the usage application, two types including a traveling application and a non-traveling application are defined.

Then, in this embodiment, in a case where the usage application is the traveling application, two kinds of applications including "a specific destination is defined (that is, a destination known application)" and "a specific destination is an undetermined application (that is, a destination undetermined application)" are defined. The application-navi functioning unit 116 inquires the passenger of whether any one is selected, and inquires the passenger of whether the selected traveling application is used under the automatic driving mode or the manual driving mode. Moreover, in a case where there are the normal automatic driving mode, in which the driving mode is switched into the manual driving mode on the basis of predetermined behavior of the driver, and the forcible automatic driving mode, in which the driving mode is not switched into the manual driving mode even when the predetermined behavior is carried out by the driver, among the automatic driving modes, the application-navi functioning unit 116 may inquire the passenger of whether the selected traveling application is used under the normal automatic driving mode or the forcible automatic driving mode. In this regard, in case of the fully automatic driving vehicle that does not require any manual driving operation by the driver entirely, that is, which is not provided with the manual driving mode, the selected traveling application is used under the automatic driving mode. This usage under the automatic driving mode is the same as usage under the forcible automatic driving mode in the sense that the driving mode cannot be switched into the manual driving mode.

Then, when the destination known application is selected, the application-navi functioning unit 116 receives setting of a destination from the passenger.

Further, in this embodiment, when the destination undetermined application is selected, the application-navi functioning unit 116 inquires the passenger of "a destination attribute is selected", such as a "mountain", a "river", a "sea", a "lake", or an "amusement park", or "only a usage time is designated." Then, when "a destination attribute is selected" is selected, the application-navi functioning unit 116 presents a list of destination attributes to the passenger, and receives selection from the list. The application-navi functioning unit 116 may cause the passenger to directly input and designate a destination attribute as a free keyword. In this regard, when the destination known application is selected, it is possible to cause the passenger to "select a transit point attribute" such as a "mountain", a "river", a "sea", a "lake", or a "amusement park" as a transit point to the destination.

Further, when "only a traveling time to be used is designated" is selected, the application-navi functioning unit 116 causes the passenger to designate a traveling time to be used, and receives it. In this regard, the application-navi functioning unit 116 may cause the passenger to set a traveling end time from the current time to a time when traveling is started in place of designation of the traveling time.

Then, in this embodiment, the AV entertainment functioning unit 117, the game functioning unit 125, and the massage mechanism driving unit 118 are provided as the usage applications other than traveling. In this embodiment, in a case where the passenger designates a non-traveling application, the application-navi functioning unit 116 presents various kinds of AV related functions, a game relation function, and a massage function, which can be provided by the AV entertainment functioning unit 117, as will be described later, to the passenger to inquire the passenger whether it is used or not, and receives selection as a response thereof.

Then, the application-navi functioning unit 116 encourages the passenger to carry out an input operation for an activation instruction after selection setup of the usage application by the passenger is determined. The control unit 101 confirms the input operation for the activation instruction by the passenger. Then, the control unit 101 controls power source supply from the battery 11 to execute the usage application determined by the application-navi functioning unit 116, and controls the electronic control circuit unit 10 in the automatic driving vehicle 1. Details of a flow of processes by the application-navi functioning unit 116 will be described later in detail.

The AV entertainment functioning unit 117, the game functioning unit 125, and the massage mechanism driving unit 118 are examples of functioning units each of which provides a non-traveling application. As the non-traveling applications, there are an application to get a rest quietly such as sleep, an application to enjoy drinking and eating, an application to read a book, and an application to concentrate upon work or study. Of course, they are not limited to these.

In case of the application to get a rest quietly such as sleep, the automatic driving vehicle 1 includes a function to set temperature in the vehicle interior by a vehicle air conditioner to be comfortable at 20 to 21° C. in winter and 27 to 28° C. in summer, and a function to ensure a state that good sleep is allowed by dropping a curtain for a window to set the window to a light shielding mode in which light outside the vehicle such as solar light is blocked out, turning off lighting of the vehicle interior or darkening the lighting. Moreover, the automatic driving vehicle 1 causes the seat to be reclined or flat so as to be suitable for good sleep.

Further, in case of the application to enjoy drinking and eating, the automatic driving vehicle 1 sets a table in the vehicle interior. In a case where a refrigerator is provided therein, it is possible to designate a beverage or foods from the refrigerator. The automatic driving vehicle 1 includes a function to set the lighting to favorite illuminance suitable for drinking and eating of the passenger. In this regard, in case of designation of a beverage, it is also possible to designate alcohol drinks. A situation that designation of alcohol drinks is allowed is limited "other than traveling application" or "automatic driving" in the "traveling application."

In case of the application to read a book, the automatic driving vehicle 1 is configured to be capable of allowing the user to select an electronic book (e-book) (it may access a provision server for electronic books on the Internet through the wireless communication unit 124, and obtain any electronic book), causing the display unit 111 to display the content of the selected electronic book on the display screen, and read it aloud through the speaker 135 if needed.

In case of the application to concentrate upon work or study, the automatic driving vehicle 1 is configured to be capable of blocking out an outside scene by dropping the curtain for the window or setting the window to the light shielding mode, and making the lighting of the vehicle interior brighter to secure a state where the passenger is allowed to concentrate upon work and study. Further, the automatic driving vehicle 1 is configured to be capable of presenting material required for work or study through a personal computer (not illustrated in the drawings).

The AV entertainment functioning unit 117 is a functioning unit configured to reproduce at least one of voice information, music information or image information. For example, the AV entertainment functioning unit 117 includes a television broadcast receiving functioning unit, an AM and FM radio broadcast receiving functioning unit, and a disc reproducing functioning unit for a CD or DVD, and a BD (Blu-ray Disc). Although its illustration is omitted, the AV entertainment functioning unit 117 includes an antenna for receiving television broadcast, an antenna for receiving AM and FM radio broadcast, and a multiple-disc drive for the disc reproducing functioning unit.

The voice information or the music information reproduced by the AV entertainment functioning unit 117 is outputted as sound through the speaker 135, and the image information reproduced by the AV entertainment functioning unit 117 is displayed on the display screen of the display unit 111. They are thereby used for the passenger.

The game functioning unit 125 is a functioning unit configured to execute various kinds of games including an action game, a simulation game, a shooting game, a role playing game, a fighting game and the like. One controller or a plurality of controllers for games (not illustrated in the drawings) are prepared for the game functioning unit 125, and the user operates any game by using this controller for games. Voice information and music information of the game are outputted as sound through the speaker 135, and image information of the game is displayed on the display screen of the display unit 111. They are thereby used for the user.

The massage mechanism driving unit 118 drives a massage mechanism embedded in a seat such as the driver's seat or the front passenger seat, for example. The massage mechanism is a mechanical unit that performs a massage action against the passenger who sits on the seat in which the mechanical unit is embedded, for example. Of course, in order for the seat to fit the massage, for example, the seat may be movable by the mechanical unit so as to be reclined or flat. Further, a mechanical unit to rotate the seat may be embedded in the massage mechanism driving unit 118. In this case, the massage mechanism driving unit 118 may rotate the seat not only in case of an application for the massage, but also in case of the application to enjoy drinking and eating. This makes it possible to cause a plurality of passengers to face each other, or cause opponents to face each other in the fighting game of a game application. Further, in the application to read a book, the application to concentrate upon work or study, and the like, each application can be executed in a user's favorite direction of the seat.

In this regard, the AV entertainment functioning unit 117, the game functioning unit 125, and the massage mechanism driving unit 118 can not only be used at the time of stoppage of the automatic driving vehicle 1 when the traveling driving system including the motor driving unit 131 of the automatic driving vehicle 1 is not activated, can but also be used at the time of the traveling of the automatic driving vehicle 1 by means of a usage starting instruction from the passenger.

The automatic driving vehicle 1 is configured so that the power source supply from the battery 11 can be supplied independently to each of the television broadcast receiving functioning unit, the AM and FM radio broadcast receiving functioning unit, and the disc reproducing functioning unit for a CD or a DVD, and a BD of the AV entertainment functioning unit 117, and can also be supplied independently to each of the game functioning unit 125 and the massage mechanism driving unit 118. Of course, the automatic driving vehicle 1 is configured so that the power source supply to the traveling driving system and the power source supply to each of the AV entertainment functioning unit 117, the game functioning unit 125, and the massage mechanism driving unit 118 can also be made independently.

Information on past usage applications for the automatic driving vehicle 1 by the user (or the passenger), whose image for identification (for example, a face image) is stored and registered in the user image information storing unit 134, is accumulated in the history memory 119 so as to be associated with the user ID.

FIG. 2 illustrates an example of information stored in this history memory 119. As illustrated in FIG. 2, information on a user name and a usage history is stored for each of the users registered in advance so as to be associated with his or her user ID. In this embodiment, information on the usage history contains items such as usage date and day of week thereof, the application type described above, the application content, application details, or the usage time.

As the application type of the usage history, any of the two types including the traveling application and the non-traveling application described above is stored in the history memory 119. In this case, in a case where the application type is the traveling application, the application type is stored in accordance with information on whether it is traveling in the automatic driving mode or traveling in the manual driving mode. In the example illustrated in FIG. 2, "traveling: automatic" indicates the traveling in the automatic driving mode, and "traveling: manual" indicates the traveling in the manual driving mode. In this regard, in this example, whether it is the traveling in the automatic driving mode or the traveling in the manual driving mode is set to a driving mode when the traveling is started. When the driving mode is switched on the way, the switching may of course be left as the history.

Then, in this embodiment, in a case where the application type is the traveling application, as the application content, any of a "specific destination defined (destination known) application" or "specific destination undetermined (destination undetermined) application" is stored. Then, in a case where the application content is for the destination known application, as illustrated in FIG. 2, a departure place (or a current location) and a destination such as "his or her home to XY station" is stored in the application details thereof, for example. As the departure place (current location), the current location at the time of start of the traveling, which is detected by the current location detecting unit 110 is recorded. In a case where the application content is for the destination undetermined application, as illustrated in FIG. 2, a usage time such as "return by 30 minutes", a usage end time such as "return by 3 p.m.", or an attribute of the destination such as "to a nearby sea" is stored in the application details thereof, for example.

Further, in a case where the application type is the non-traveling application, any of "AV/game relation" using the AV entertainment functioning unit 117 or the game functioning unit 125, a massage application using the massage mechanism driving unit 118, and "massage or the like" that is the other application is stored as the application content. Then, in a case where the application content is the "AV/game relation", as illustrated in FIG. 2, any AV entertainment function of the AV entertainment functioning unit 117 such as "music reproduction" or "game", or a game function of the game functioning unit 125 is stored as the application details, for example. In a case where the application content is the "massage or the like", as illustrated in FIG. 2, "massage" or "the other" is stored as the application details, for example.

In this regard, for passengers to each of whom a user ID is not assigned, information on the respective items described above may be accumulated in the history memory 119 as the history information of "the other user" without distinguishing the individual passengers.

The user or the passenger may be allowed to delete part or all of the information accumulated in the history memory 119. However, security is ensured so that information on the other than the user or the passenger oneself cannot be deleted.

The history analyzing unit 120 analyzes the history information for each user (or each user ID) stored in the history memory 119. In a case where there is an application used habitually (hereinafter, referred to as a "habitual usage application"), the history analyzing unit 120 detects it. In addition, the history analyzing unit 120 may also detect frequency of use. In this case, the habitual usage application may be notified by being preferentially inquired. Further, the higher the application has frequency of use, the higher (higher rank) the application may have a presentation order, thereby preferentially displaying it. Here, in this embodiment, the habitual usage application is subjected to the item "application details" in storage information of the history memory 119.

Then, in this embodiment, the history analyzing unit 120 detects an application (application details) that is habitually and repeatedly used on specific day of week within one week or an application (application details) that is habitually and repeatedly used at a specific time within one day as the habitual usage application. The detection of the habitual usage application is not limited to this. For example, an application (application details) that is habitually and repeatedly used in a specific period within one year such as New Year holidays, Lunar New Year holidays (Spring Festival), Easter, or Bon Festival, or on specific date of specific month within one year such as birthday, Saint Valentine's Day, Halloween, Christmas Eve, or Christmas may be detected as the habitual usage application. In addition, an application (application details) that is habitually and repeatedly used with periodicity every alternate day or every several days may be detected as the habitual usage application. Of course, an application (application details) that is habitually and repeatedly used on specific day of every month, such as having a meal at a specific restaurant on pay day in case of the monthly salary, may be detected as the habitual usage application.

In this regard, evaluation of the application used by the user oneself can be subjected to feedback. The application with higher evaluation may be presented preferentially from the next time.

The speaker 135 is connected to the voice input/output unit 121. The microphone 136 is also connected to the voice input/output unit 121. In the first embodiment, the speaker 135 is used for inquiry of the usage application by voice in the application-navi functioning unit 116, attention notification, and the like. Further, in this embodiment, the speaker 135 is used for notification to the driver or the passenger at the time of switching from the manual driving mode to the automatic driving mode, notification at the time of switching from the automatic driving mode to the manual driving mode, and the like.

Further, as described above, the microphone 136 is used to collect a voice input from the passenger for voice recognition, and in this embodiment, as described above, the microphone 136 is used to collect a siren of an emergency vehicle such as a police car or collect grade crossing sound. In this regard, in this example, a plurality of microphones 136 including one provided in the vehicle interior of the automatic driving vehicle 1 and ones provided outside the automatic driving vehicle 1 such as a ceiling portion or a door mirror for collecting the siren of the emergency vehicle such as the police car are provided.

Although its illustration is omitted, a memory for storing voice message data to output sound to the outside is embedded in the voice input/output unit 121, and a voice synthesizer or a D-A converter for converting the voice message data read out from the memory into an analog voice signal is also embedded therein. Then, the voice input/output unit 121 supplies a voice message selected by a control of the control unit 101 to the speaker 135, and output the sound to the outside as voice. In this regard, as voice messages to be stored, for example, messages to notify switching of the driving mode, such as "it is switched into the automatic driving mode", or "it is switched into the manual driving mode" and inquiry messages to encourage the passenger to set a destination in the application-navi functioning unit 116 are prepared.

The clock unit 122 includes a calendar function to provide year, month, day, day of week, and the current date and time, and a timer function to measure a time from predetermined timing on the basis of a control of the control unit 101.

The battery 11 is connected to the battery remaining amount detecting unit 123. The battery remaining amount detecting unit 123 constitutes a driving source remaining amount detecting unit. In this embodiment, the battery remaining amount detecting unit 123 detects a remaining amount of the battery 11 as the driving source. Then, in this embodiment, the battery remaining amount detecting unit 123 includes a function to detect, in case of the traveling application, how long distance the traveling is allowed by the remaining amount or how long time the traveling is allowed, and a function to detect, in case of the non-traveling application, how long time each AV entertainment function of the AV entertainment functioning unit 117, the game functioning unit 125, or the massage mechanism driving unit 118 can be continuously used by the remaining amount. Then, in this embodiment, the control unit 101 includes a function to inform the passenger of information on the detected remaining amount of the battery 11.

The wireless communication unit 124 is used to connect to a provision server for AV information, a provision server for the game content, or a peripheral retrieval server through the Internet. Namely, in this embodiment, the control unit 101 is configured to access the provision server for the AV information on the Internet through this wireless communication unit 124, and allow the AV entertainment functioning unit 117 to reproduce the AV information obtained from the provision server. Further, the control unit 101 is also configured to access the provision server of the game content on the Internet through this wireless communication unit 124, and allow the game functioning unit 125 to use the game content downloaded from the provision server or allow the game functioning unit 125 to participate in an online game via the provision server of the game content.

Moreover, the control unit 101 includes a function to access the peripheral retrieval server through this wireless communication unit 124, request search for a location suitable a designated destination attribute around the current location, and obtain a search result thereof from the peripheral retrieval server to present it to the passenger.

As described above, the electronic control circuit unit 10 in the automatic driving vehicle 1 is configured. However, among the respective blocks illustrated in FIG. 1, the control unit 101 can realize, as software processing, a processing function of each of the motor driving control unit 102, the steering driving control unit 103, the manual/automatic driving mode switching control unit 104, the surrounding moving object grasping unit 109, the current location detecting unit 110, the car-navi functioning unit 113, the image recognizing unit 114, the voice recognizing unit 115, the application-navi functioning unit 116, the AV entertainment functioning unit 117, the massage mechanism driving unit 118, the battery remaining amount detecting unit 123, and the game functioning unit 125.

[Example of Flow of Processing by Application-Navi Functioning Unit 116]

Next, an example of a flow of processes by the application-navi functioning unit 116 in a case where a passenger gets into the automatic driving vehicle 1 will be described while referring to flowcharts illustrated in FIG. 3 to FIG. 11 and display examples on the display screen of the display unit 111 illustrated in FIG. 12 to FIG. 15. In this regard, in the following explanation, a case where the control unit 101 realizes, as software processing, the processing function of each of the application-navi functioning unit 116 and the motor driving control unit 102, the steering driving control unit 103, the manual/automatic driving mode switching control unit 104, the surrounding moving object grasping unit 109, the current location detecting unit 110, the car-navi functioning unit 113, the image recognizing unit 114, the voice recognizing unit 115, the AV entertainment functioning unit 117, the massage mechanism driving unit 118, the battery remaining amount detecting unit 123, and the game functioning unit 125 will be described.

Even before the electronic control circuit unit 10 of the automatic driving vehicle 1 is activated, the control unit 101 and the group of sensors 108 are set to a stand-by state by applying a power source voltage thereto from the battery 11. The control unit 101 monitors, in this stand-by state, whether a passenger gets into the own vehicle or not (Step S101 in FIG. 3).

Then, in a case where it is determined at Step S101 that the passenger who gets into the own vehicle is detected, the control unit 101 applies the power source voltage to at least a camera for the vehicle interior of the group of cameras 107, and the camera shoots a face image of the passenger. The image recognizing unit 114 determines whether the passenger is one of the registered users whose face images are stored in the user image information storing unit 134 or not (Step S102).

In a case where it is determined at Step S102 that the passenger is one of the registered users, the control unit 101 obtains a user ID of the passenger, and refers to history information that is stored in the history memory 119 so as to be associated with the user ID (Step S103). Then, the control unit 101 obtains information on year, month, date, and day of week of a current point in time from the clock unit 122, and analyzes, by the function of the history analyzing unit 120, whether a habitual usage application related to the current point in time exists for the passenger or not (Step S104).

Then, the control unit 101 determines, from an analysis result at Step S104, whether the habitual usage application for the passenger exists or not (Step S105). In a case where it is determined that the habitual usage application exists, the control unit 101 causes the display unit 111 to display an inquiry message on the display screen, and outputs sound thereof as a voice message through the speaker 135, thereby executing inquiry about whether the habitual usage application is to be executed or not to the passenger (Step S106).

For example, in a case where the current point in time is 7 a.m. on a weekday and the passenger always causes the automatic driving vehicle 1 to travel from his or her home to a parking lot of the nearest station for traveling to work, the control unit 101 determines it as the habitual usage application, then, as illustrated in FIG. 12(A), causes the display unit 111 to display, on a display screen 111D thereof, an inquiry message "you always travels to XY station by the automatic driving at this time, and do you execute it today?", and outputs sound thereof through the speaker 135, thereby executing the inquiry.

Further, for example, in a case where the current point in time is 3 p.m. on Saturday and the passenger always receives a massage of a non-traveling application, the control unit 101 determines it as the habitual usage application, then, as illustrated in FIG. 12(B), causes the display unit 111 to display, on the display screen 111D thereof, an inquiry message "you always utilize a massage at this time, and do you utilize it today?", and outputs sound thereof through the speaker 135, thereby executing the inquiry.

Then, at this time, as illustrated in FIG. 12(A) and FIG. 12(B), the control unit 101 also causes the display unit 111 to display response items including "execute" and "not execute" on the display screen. The passenger is allowed to carry out a response operation to select any one thereof through the display screen, and to respond, by a voice input, which is selected. Then, when the passenger responds, response information thereof is transmitted to the control unit 101 through the touch panel 112 or the voice recognizing unit 115.

Then, the control unit 101 determines whether the response information of the passenger is "execute" or not (Step S107). In a case where it is determined that it is "execute", the control unit 101 executes the habitual usage application for the passenger determined at Step S104 (Step S108).

Namely, in a case where the habitual usage application is a traveling application as illustrated in FIG. 12(A) as an example, the control unit 101 applies the power source voltage from the battery 11 to the traveling driving system required for traveling of the own vehicle and the like to activate them, and controls the own vehicle to execute the traveling in the manual driving mode or the automatic driving mode. Further, in a case where the habitual usage application is a non-traveling application as illustrated in FIG. 12(B) as an example, in this example in which the application other than traveling is provided as the habitual usage application, the control unit 101 applies the power source voltage from the battery 11 to the AV entertainment functioning unit 117, the game functioning unit 125, or the massage mechanism driving unit 118 to activate it, and controls the own vehicle to execute the non-traveling application. In this regard, a history of the executed usage application is associated with the user ID of the passenger, and the content as illustrated in FIG. 2 described above is stored in the history memory 119.

Figure 4:
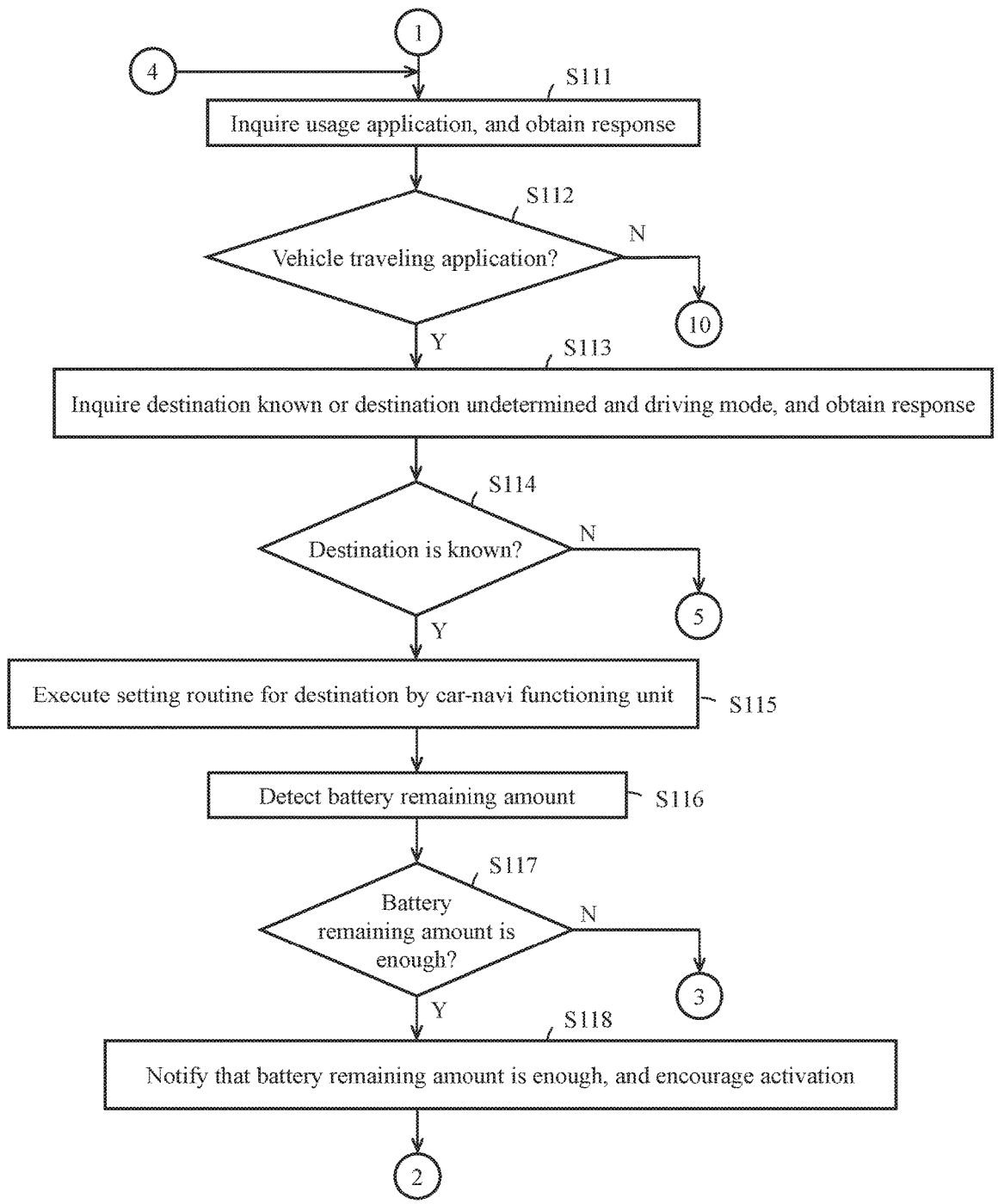
FIG. 4 is a view illustrating a flowchart for explaining a part of the flow of the example of the processing operation by the electronic control circuit unit of the automatic driving vehicle in the example of FIG. 1.

In a case where it is determined at Step S102 that the passenger is not the registered user, it is determined at Step S105 that the habitual usage application for the passenger does not exist, or the response "the habitual usage application is not executed" is received from the passenger at Step S107, then the control unit 101 causes the display unit 111 to display the inquiry message of the inquiry of the usage application of the own vehicle on the display screen, and outputs sound thereof through the speaker 135 as a voice message, thereby executing the inquiry (Step S111 in FIG. 4).

At Step S111, as types of the usage application, the control unit 101 causes the display unit 111 to display, on the display screen 111D thereof, "1, vehicle traveling" as the traveling application and "2, other than traveling" as the application other than traveling, for example, as illustrated in FIG. 13(A), and presents it through the speaker 135 by voice to inquire it of the passenger.

Then, against this inquiry, the passenger is allowed to carry out a response operation to select any one through the display screen, and carry out a response to select any one by a voice input. Then, when the passenger carries out the response, the response information is transmitted to the control unit 101 through the touch panel 112 or the voice recognizing unit 115.

Thus, the control unit 101 determines whether the response information of the passenger is related to the vehicle traveling application or not (Step S112). In a case where it is determined that it is the vehicle traveling application, the control unit 101 inquires of the passenger whether the destination is known or undetermined, and whether the driving mode to be used is the manual driving mode or the automatic driving mode (Step S113). FIG. 13(B) illustrates a display example for this inquiry at Step S113 displayed on the display screen 111D of the display unit 111. As well as the above, the inquiry is also executed by voice through the speaker 135.

Then, against this inquiry at Step S113 the passenger can carry out a response operation to select any one of "destination known" and "destination undetermined" through the display screen 111D of the display unit 111; carry out a response operation to select any one of the manual driving mode and the automatic driving mode; and also carry out the responses by a voice input. Then, when the passenger carries out the response, response information thereof is transmitted to the control unit 101 through the touch panel 112 or the voice recognizing unit 115.

Thus, the control unit 101 determines whether the response information of the passenger is the "destination known" or not (Step S114). In a case where it is determined that it is the "destination known", the control unit 101 executes a setting routine for the destination by the car-navi functioning unit 113 (Step S115). Namely, the control unit 101 causes the display unit 111 to display a reception screen for setting a destination as illustrated in FIG. 13(C) on the display screen 111D, for example, and receives a setting input for the destination. In this regard, as illustrated in FIG. 13(C), on receiving this destination setting, the passenger is also allowed to set, in addition to the destination, a transit point and a priority condition such as time priority, distance priority, general road priority, or toll road priority. A setting input can be carried out not only through the touch panel 112, which is superposed on the display screen 111D, but also by a voice input through the microphone 136.

When the setting input for the destination is received at Step S115, the control unit 101 detects a remaining amount of the battery 11 by means of the function of the battery remaining amount detecting unit 123 (Step S116). Then, the control unit 101 determines whether the detected remaining amount of the battery 11 is enough for traveling to the set destination or not (Step S117).

In a case where it is determined at Step S117 that the remaining amount of the battery 11 is enough for the traveling to the set destination, the control unit 101 notifies that effect of the passenger through the display screen 111D of the display unit 111 as illustrated in FIG. 13(D), for example, and notifies that effect of the passenger through the speaker 135, thereby encouraging the passenger to activate the own vehicle (Step S118). As illustrated in FIG. 13(D), a button icon 201 of "start" for an activation instruction is displayed on the display screen 111D.

Figure 5:
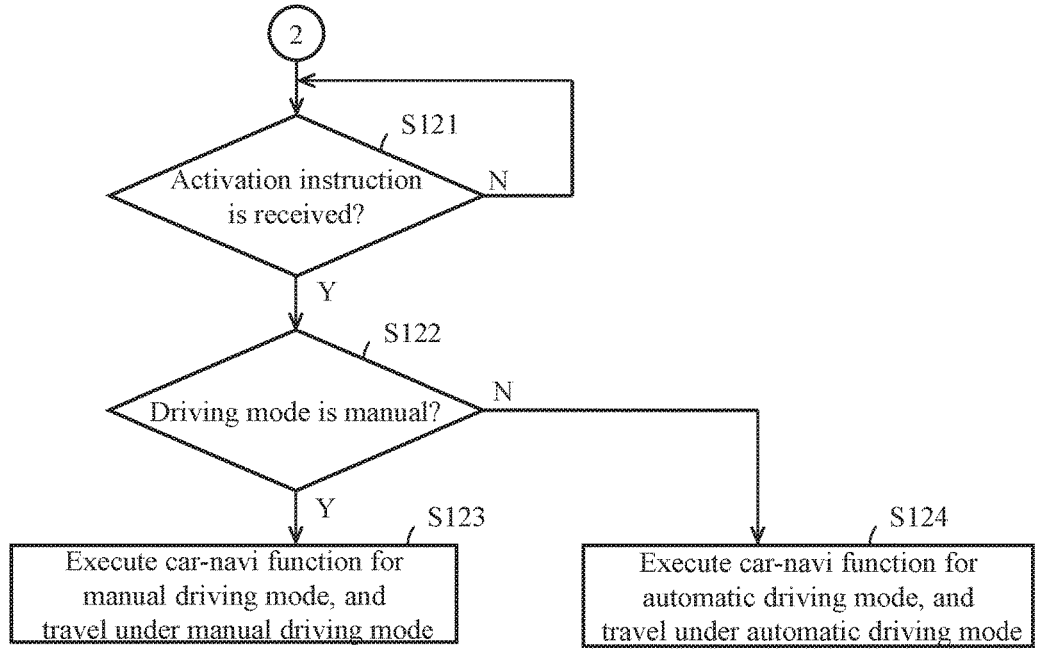
FIG. 5 is a view illustrating a flowchart for explaining a part of the flow of the example of the processing operation by the electronic control circuit unit of the automatic driving vehicle in the example of FIG. 1.

Next, the control unit 101 determines whether the activation instruction by operating the button icon 201 through the touch panel 112 or the activation instruction by voice through the voice recognizing unit 115 is received or not (Step S121 in FIG. 5).

In a case where it is determined that an activation instruction is not received, the control unit 101 causes the processing flow to return to Step S121, and waits for receipt of an activation instruction. Then, in a case where it is determined at Step S121 that an activation instruction is received, the control unit 101 refers to the response result obtained at Step S113, and determines whether the driving mode is set to the manual driving mode or not (Step S122). Then, in a case where it is determined at Step S122 that the driving mode is set to the manual driving mode, the control unit 101 executes a car-navi function for the manual driving mode, and causes the own vehicle to travel under the manual driving mode as the driving mode in response to the manual driving operation of the passenger (Step S123).

Further, in a case where it is determined at Step S122 that the driving mode is not set to the manual driving mode but set to the automatic driving mode, the control unit 101 executes a car-navi function for the automatic driving mode, and cause the own vehicle to travel under the automatic driving mode as the driving mode (Step S124).

In this regard, a history of the usage application executed at Step S123 or Step S124 is associated with the user ID of the passenger, and the content as illustrated in FIG. 2 described above is stored in the history memory 119.

Figure 6:
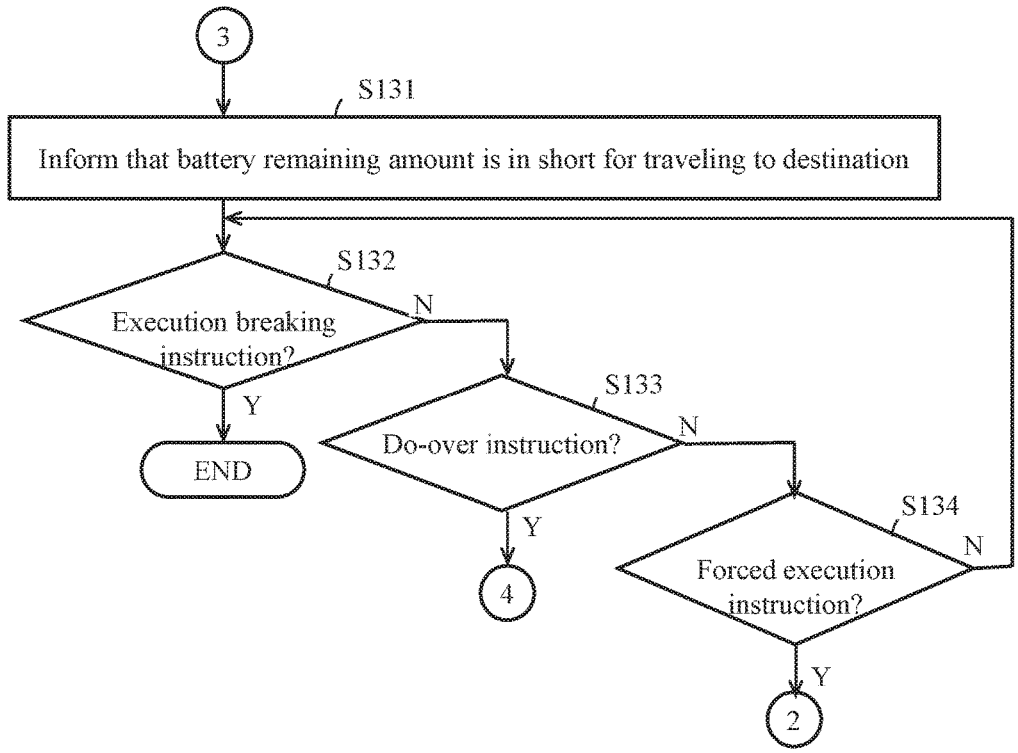
FIG. 6 is a view illustrating a flowchart for explaining a part of the flow of the example of the processing operation by the electronic control circuit unit of the automatic driving vehicle in the example of FIG. 1.

Further, in a case where it is determined at Step S117 that the remaining amount of the battery 11 is not enough, the control unit 101 informs, through the display screen 111D of the display unit 111, the passenger that the remaining amount of the battery 11 is in short for traveling to the destination as illustrated in FIG. 13(E), for example, and informs the passenger of it through the speaker 135 (Step S131 in FIG. 6).

In this case, as correspondence operations that the passenger is allowed to select against this information at Step S131, there are three kinds including execution breaking of the selected usage application, a do-over of the setting of the usage application, and forcible execution of the selected usage application. As illustrated in FIG. 13(E), button icons 202, 203, and 204 for selecting them are displayed on the display screen 111D of the display unit 111.

Then, the control unit 101 determines whether an "execution breaking instruction" based on an operation against the button icon 202 through the touch panel 112 or an "execution breaking instruction" by voice through the voice recognizing unit 115 is received or not (Step S132). In a case where it is determined that the "execution breaking instruction" is received, the control unit 101 terminates this processing routine.

Further, in a case where it is determined at Step S132 that any "execution breaking instruction" is not received, the control unit 101 determine whether a "do-over instruction" based on an operation against the button icon 203 through the touch panel 112 or a "do-over instruction" by voice through the voice recognizing unit 115 is received or not (Step S133). In a case where it is determined that the "do-over instruction" is received, the control unit 101 causes the processing flow to return to Step S111 in FIG. 4, and executes the do-over of the setting of the usage application.

Further, in a case where it is determined at Step S133 that any "do-over instruction" is not received, the control unit 101 determines whether a "forced execution instruction" based on an operation against the button icon 204 through the touch panel 112 or a "forced execution instruction" by voice through the voice recognizing unit 115 is received or not (Step S134). In a case where it is determined that the "forced execution instruction" is received, the control unit 101 causes the processing flow to return to Step S121 in FIG. 5, and executes the processes after Step S121. In a case where it is determined that any "forced execution instruction" is not received, the control unit 101 causes the processing flow to return to Step S13, and executes processes after Step S132.

Figure 7:
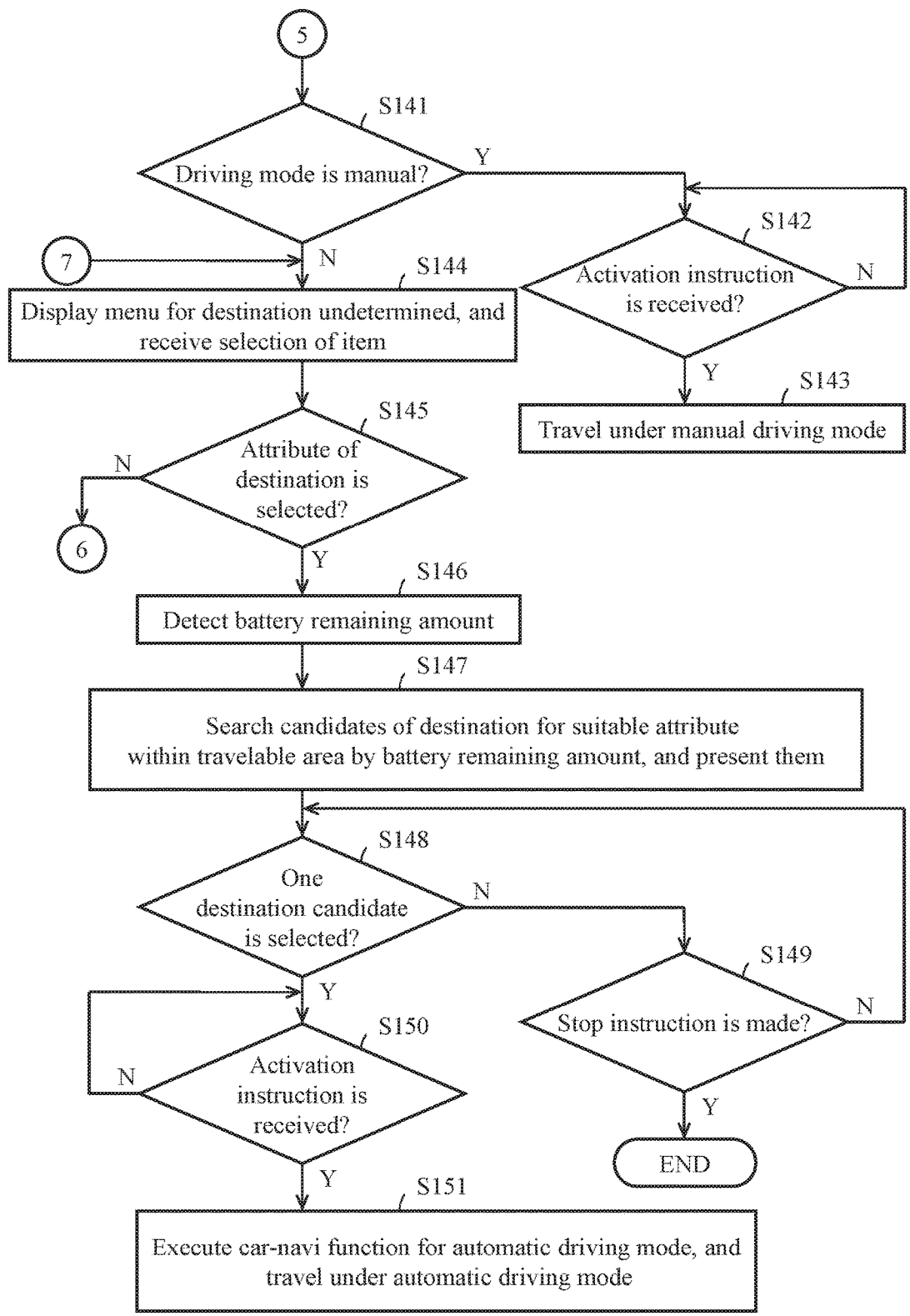
FIG. 7 is a view illustrating a flowchart for explaining a part of the flow of the example of the processing operation by the electronic control circuit unit of the automatic driving vehicle in the example of FIG. 1.

Further, in a case where it is determined at Step S114 in FIG. 4 that it is not the "destination known" but the "destination undetermined", the control unit 101 refers to the response result obtained at Step S113, and determines whether the driving mode is set to the manual driving mode or not (Step S141 in FIG. 7).

Then, in a case where it is determined at Step S141 that the driving mode is set to the manual driving mode, the control unit 101 determines whether an activation instruction through the touch panel 112 or an activation instruction by voice through the voice recognizing unit 115 is received or not (Step S142). In a case where it is determined that the activation instruction is not received, the control unit 101 causes the processing flow to return to Step S142, and waits for receipt of an activation instruction. Then, in a case where it is determined at Step S142 that the activation instruction is received, the control unit 101 causes the own vehicle to travel under the manual driving mode as the driving mode in response to the manual driving operation of the passenger (Step S143).

Further, in a case where it is determined at Step S141 that the driving mode is set to the automatic driving mode, the control unit 101 causes the display unit 111 to display a menu for the "destination undetermined" on the display screen 111D, and receives selection of an item from the menu (Step S144).

FIG. 14(B) illustrates a display example of an application menu for the "destination undetermined" in this case. Namely, when the passenger selects the "destination undetermined" after the vehicle traveling application is selected, the display screen 111D of the display unit 111 is changed from an inquiry screen for the vehicle traveling application illustrated in FIG. 14(A), which is the same as FIG. 13(B), to the menu of the "destination undetermined" illustrated in FIG. 14(B). In this regard, the menu content is also presented to the passenger by voice through the speaker 135.

It this example illustrated in FIG. 14(B), a list of attributes of selectable destinations and a reception field for settings of a traveling time are provided in the menu for the "destination undetermined." When the passenger does not decide a specific destination but decides an attribute of a desired destination such as "want to go to a sea", "want to go for viewing a mountain", "want to go to a river", the passenger is allowed to select a desired destination attribute from the list of the attributes of the destinations. Further, when the passenger does not decide a specific destination but hopes to travel for a predetermined time by the automatic driving vehicle 1, the passenger is allowed to set the desired traveling time. Selection of the attribute of the destination from the list and reception of the setting of the traveling time are made through the touch panel 112 or the voice recognizing unit 115.

Next, the control unit 101 determines whether the passenger selects an attribute of the destination via this menu for the "destination undetermined" or not (Step S145). In a case where it is determined that the attribute of the destination is selected, the control unit 101 detects the remaining amount of the battery 11 (Step S146). Then, the control unit 101 searches candidates of destinations suitable for the selected attribute of the destination within a travel able area by the detected remaining amount of the battery 11. As illustrated in FIG. 14(C), the control unit 101 causes the display unit 111 to display candidate(s) of one destination to a plurality of destinations in a search result on the display screen 111D, and outputs sound by voice through the speaker 135, thereby presenting the candidate(s) to the passenger (Step S147). In this regard, display of the search result is not limited to character display, but may be image display or video display. Further, a guide or a manual of each of the candidates of the destinations may be added thereto.

This search of locations suitable for the attribute of the destination is executed by the function of the car-navi functioning unit 113 by using the car-navi database 133. If an appropriate search result is obtained, the process is terminated within a range thereof. However, if any appropriate search result is not obtained, the control unit 101 accesses the peripheral retrieval server through the Internet by means of the wireless communication unit 124, and obtains a search result from the peripheral retrieval server.

Next to Step S147, the control unit 101 determines whether one destination candidate is selected from the destination candidates displayed on the display screen 111D or not (Step S148). In a case where it is determined that any one destination candidate is selected, the control unit 101 determines whether a stop instruction is made by the passenger through the touch panel 112 or the voice recognizing unit 115 or not (Step S149). In a case where it is determined at Step S149 that the stop instruction is made, the control unit 101 terminates this processing routine. Further, in a case where it is determined at Step S149 that any stop instruction is not made, the control unit 101 causes the processing flow to return to Step S148.

Further, in a case where it is determined at Step S148 that one destination candidate is selected, the control unit 101 determines whether an activation instruction based on an operation against the button icon 201 through the touch panel or an activation instruction by voice through the voice recognizing unit 115 is received or not (Step S150). In a case where it is determined that an activation instruction is not received, the control unit 101 causes the processing flow to return to Step S150, and the control unit 101 waits for receipt of an activation instruction.

Then, in a case where it is determined at Step S150 that an activation instruction is received, the control unit 101 executes car-navi function for the automatic driving mode, and causes the own vehicle to travel under the automatic driving mode as the driving mode (Step S151). At this time, the control unit 101 executes route search from a current location to a location of the one candidate of the destination, which it is determined to be selected at Step S148, by means of the car-navi functioning unit 113, and executes route guidance for the automatic driving mode in accordance with a route search result thereof. In this regard, a history of the executed usage application is associated with the user ID of the passenger, and the content as illustrated in FIG. 2 described above is stored in the history memory 119.

Figure 8:
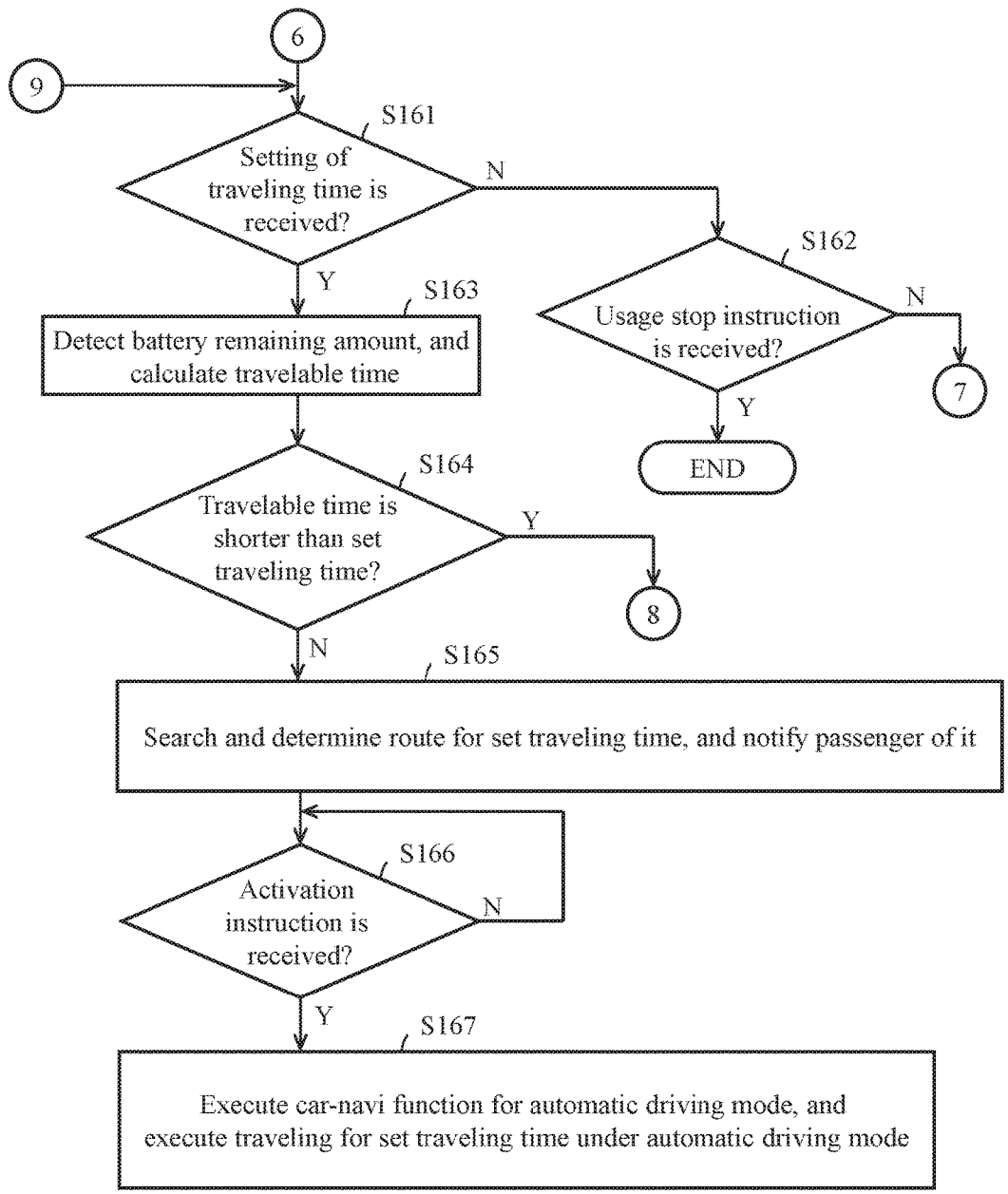
FIG. 8 is a view illustrating a flowchart for explaining a part of the flow of the example of the processing operation by the electronic control circuit unit of the automatic driving vehicle in the example of FIG. 1.

Further, in a case where it is determined at Step S145 that any attribute of the destination is not selected, the control unit 101 determines whether a setting of a traveling time is received or not (Step S161 in FIG. 8). Here, the traveling time in case of this example means a time from a time when the automatic driving vehicle 1 starts from a current location to travel on an arbitrary route to a time when the automatic driving vehicle 1 returns to the current location.

In a case where it is determined at Step S161 that the setting of the traveling time is not received, the control unit 101 determines whether a usage stop instruction based on an operation against a button icon 205 (see FIG. 14(C)) on the display screen 111D through the touch panel 112 or a usage stop instruction of the automatic driving vehicle 1 by voice through the voice recognizing unit 115 is received or not (Step S162). Then, in a case where it is determined at Step S162 that the usage stop instruction is received, the control unit 101 terminates this processing routine. In a case where it is determined that any usage stop instruction is not received, the control unit 101 causes the processing flow to return to Step S144 in FIG. 7, and executes the processes after Step S144.

In a case where it is determined at Step S161 that the setting of the traveling time is received, the control unit 101 detects the remaining amount of the battery 11, and calculates a travelable time (Step S163). Then, the control unit 101 determines whether the travelable time is shorter than the traveling time set by the passenger or not (Step S164).

Then, in a case where it is determined at Step S164 that the travelable time is longer than the traveling time set by the passenger, the control unit 101 searches and determines a route for the set traveling time by the function of the car-navi functioning unit 113, and causes the display unit 111 to display the searched route on the display screen 111D as illustrated in FIG. 14(D), thereby notifying it of the passenger (Step S165).

Next, the control unit 101 determines whether an activation instruction based on an operation against a button icon 206 (see FIG. 14(D)) through the touch panel 112 or an activation instruction by voice through the voice recognizing unit 115 is received or not (Step S166). In a case where any activation instruction is not received, the control unit 101 causes the processing flow to return to Step S166, and waits for receipt of an activation instruction.

Then, in a case where it is determined at Step S166 that an activation instruction is received, the control unit 101 executes the car-navi function for the automatic driving mode, and executes traveling for the set traveling time under the automatic driving mode as the driving mode (Step S167). In this regard, a history of the executed usage application is associated with the user ID of the passenger, and the content as illustrated in FIG. 2 described above is stored in the history memory 119.

Figure 9:
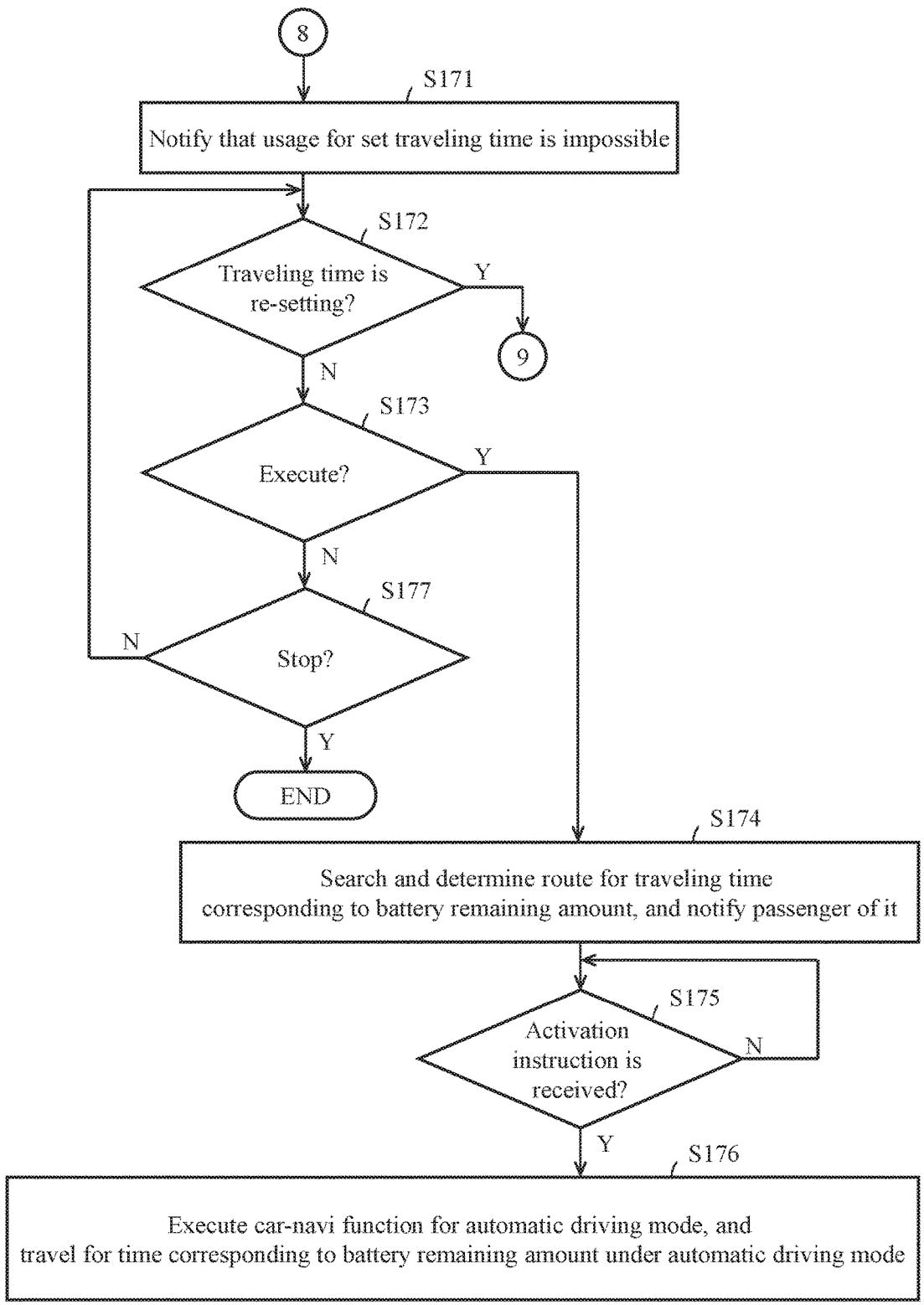
FIG. 9 is a view illustrating a flowchart for explaining a part of the flow of the example of the processing operation by the electronic control circuit unit of the automatic driving vehicle in the example of FIG. 1.

Then, in a case where it is determined at Step S164 that the travelable time is shorter than the traveling time set by the passenger, as illustrated in FIG. 14(E), the control unit 101 notifies, through the display screen 111D of the display unit 111 and the speaker 135, the passenger that "usage for set traveling time is impossible" together with display of the traveling time that is available by the remaining amount of the battery 11 (Step S171 in FIG. 9).

In this case, as correspondence operations that the passenger is allowed to select against the notification at Step S171, there are three kinds including reset of the traveling time, usage stop of the automatic driving vehicle 1, and execution for the traveling time corresponding to the remaining amount of the battery 11. As illustrated in FIG. 14(E), button icons 207, 208, and 209 for selecting them are displayed on the display screen 111D of the display unit 111.

Then, the control unit 101 determines whether an instruction for "re-setting" the traveling time based on an operation against the button icon 207 through the touch panel 112 or "re-setting" of the traveling time by voice through the voice recognizing unit 115 is received or not (Step S172). In a case where it is determined that the "re-setting" instruction is received, the control unit 101 causes the processing flow to return to Step S161 in FIG. 8, and repeats the processes after Step S161.

Further, in a case where it is determined at Step S172 that the "re-setting" instruction is not received, the control unit 101 determines whether an instruction of "execution" based on an operation against the button icon 207 through the touch panel 112 or an instruction of "execution" by voice through the voice recognizing unit 115 is received or not (Step S173).

Then, in a case where it is determined that the "execution" instruction is received, the control unit 101 searches and determines a route for the traveling time corresponding to the remaining amount of the battery 11 by means of the function of the car-navi functioning unit 113, and causing the display unit 111 to display the searched route on the display screen 111D in the similar manner to the display image illustrated in FIG. 14(D), thereby notifying it of the passenger (Step S174). In this regard, in this case, a display portion regarding the traveling time on the display screen 111D is changed into display like "traveling time corresponding to remaining amount of battery: 25 minutes" in place of display "traveling time; 30 minutes" illustrated in FIG. 14(D).

Next, the control unit 101 determines whether an activation instruction based on an operation against the button icon 206 (see FIG. 14(D)) through the touch panel 112 or an activation instruction by voice through the voice recognizing unit 115 is received or not (Step S175). In a case where it is determined that any activation instruction is not received, the control unit 101 causes the processing flow to return to Step S175, and the control unit 101 waits for receipt of an activation instruction.

Then, in a case where it is determined at Step S175 that the activation instruction is received, the control unit 101 executes the car-navi function for the automatic driving mode, and executes traveling for the traveling time corresponding to the remaining amount of the battery 11 under the automatic driving mode as the driving mode (Step S176). In this regard, a history of the executed usage application is associated with the user ID of the passenger, and the content as illustrated in FIG. 2 described above is stored in the history memory 119.

Further, in a case where it is determined at Step S173 that the "execution" instruction is not received, the control unit 101 determines whether an instruction for "usage stop" of the automatic driving vehicle 1 is received or not (Step S177). Then, in a case where it is determined at Step S177 that the "usage stop" instruction is received, the control unit 101 terminates this processing routine. In a case where it is determined that the "usage stop" instruction is not received, the control unit 101 causes the processing flow to return to Step S172, and repeats the processes after Step S172.

Figure 10:
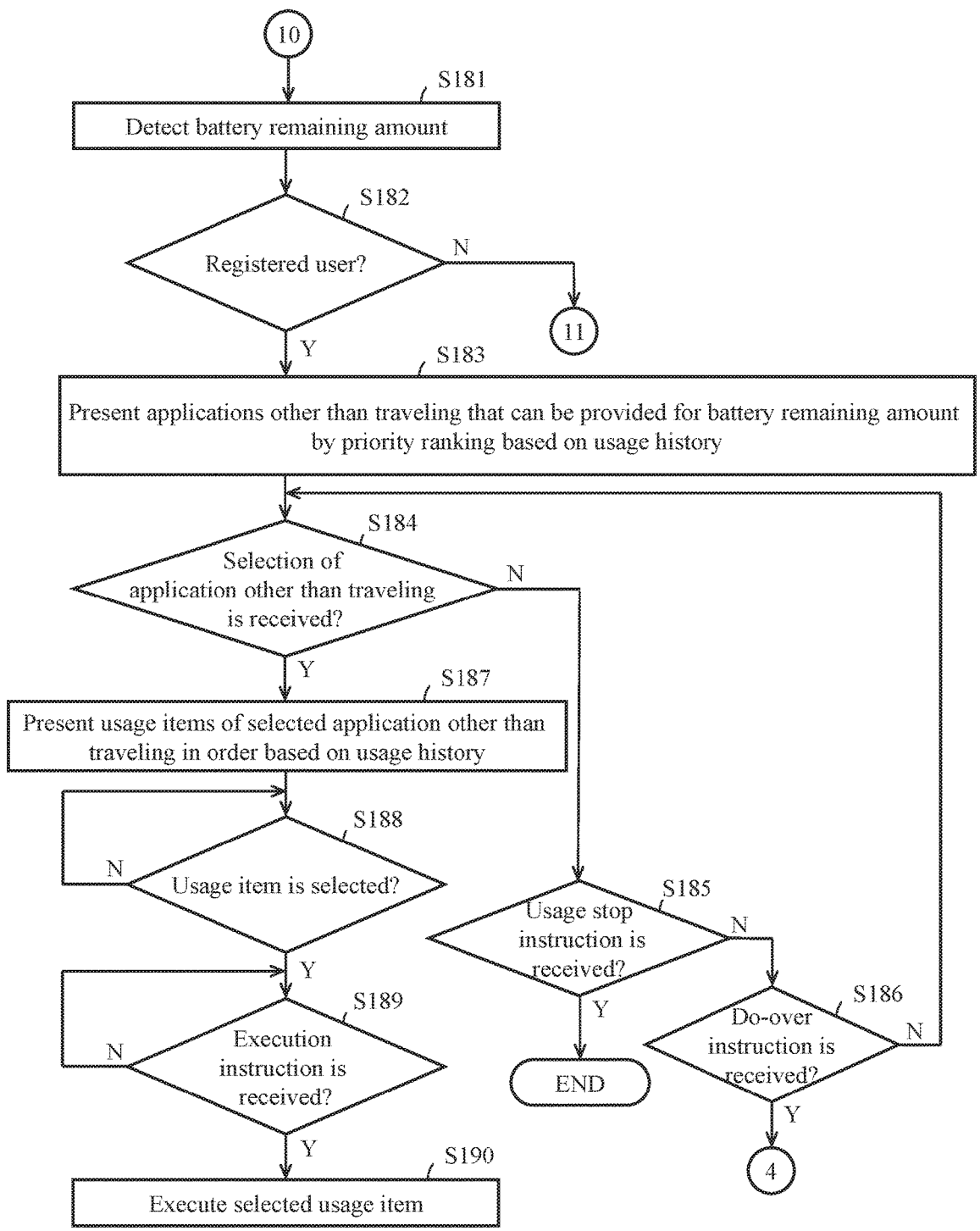
FIG. 10 is a view illustrating a flowchart for explaining a part of the flow of the example of the processing operation by the electronic control circuit unit of the automatic driving vehicle in the example of FIG. 1.

Next, in a case where it is determined at Step S112 in FIG. 4 that the response to the inquiry of the usage application is not related to the vehicle traveling application but is related to the non-traveling application, the control unit 101 detects the remaining amount of the battery 11 (Step S181 in FIG. 10). Subsequently, the control unit 101 determines whether the passenger is one of the registered users or not by using the determination result at Step S102 (Step S182).

In a case where it is determined at Step S182 that the passenger is one of the registered users, the control unit 101 presents non-traveling applications, which can be provided for the remaining amount of the battery 11 detected at Step S181, by priority ranking based on the usage history of the passenger (Step S183). For example, past usage applications of the passenger are presented so that a presentation order becomes a higher rank so the non-traveling application has many usage opportunities.

FIG. 15(B) illustrates a display example of the non-traveling application in this case. Namely, when the passenger selects the non-traveling application, the display screen 111D of the display unit 111 changes from an inquiry screen for the usage application illustrated in FIG. 15(A), which is the same as FIG. 13(A), to a list screen for the non-traveling applications illustrated in FIG. 15(B). In this regard, the content of this list of the non-traveling applications may be presented to the passenger by voice through the speaker 135.

Next, the control unit 101 determines whether selection of a non-traveling application is received or not (Step S184). In a case where it is determined that selection of a non-traveling application is not received, the control unit 101 determines whether a usage stop instruction based on an operation against a button icon 210 (see 15(B)) on the display screen 111D through the touch panel 112 or a usage stop instruction of the automatic driving vehicle 1 by voice through the voice recognizing unit 115 is received or not (Step S185).

Then, in a case where it is determined at Step S185 the usage stop instruction is received, the control unit 101 terminates this processing routine. Further, in a case where it is determined at Step S185 that the usage stop instruction is not received, the control emit 101 determines whether a do-over instruction based on an operation against a button icon 211 (see FIG. 15(B)) on the display screen 111D through the touch panel 112 or a do-over instruction by voice through the voice recognizing unit 115 is received or not (Step S186). Then, in a case where it is determined at Step S186 that any do-over instruction is not received, the control unit 101 causes the processing flow to return to Step S184, and repeats the processes after Step S184.

Further, in a case where it is determined at Step S186 that the do-over instruction is received, the control unit 101 causes the processing flow to return to Step S111 in FIG. 4, and executes the processes after Step S111.

Next, in a case where it is determined at Step S184 that selection of a non-traveling application is received, the control unit 101 causes the display unit 111 to display a list of the usage items of the selected non-traveling application on the display screen 111D in an order based on the usage history of the passenger, and notifies it by voice through the speaker 135 (Step S187). Namely, the past usage applications of the passenger are presented so that the priority ranking becomes a higher rank so the usage item of the non-traveling application has many usage opportunities.

FIG. 15(C) and FIG. 15(D) illustrate display examples of the display screen 111D at this time. Namely, FIG. 15(C) is a list of the usage items in a case where an AV/game relation function is selected as the non-traveling application. FIG. 15(D) is a list of the usage items in a case where a massage or the like is selected as the non-traveling application. In this case, as illustrated in FIG. 15(C) and FIG. 15(D), information on the time that can be used by the remaining amount of the battery 11 detected at Step S181 with respect to each of the non-traveling applications is also displayed on the display screen 111D.

Next, the control unit 101 waits for selection of any usage item (Step S188). In a case where it is determined that a usage item is selected, the control unit 101 determines whether an activation instruction (or an execution instruction) based on an operation against a button icon 212 (see FIG. 15(C)) or a button icon 21. FIG. 15(D)) on the display screen 111D through the touch panel 112 or an activation instruction (or an execution instruction) by voice through the voice recognizing unit 115 is received or not (Step S189).

Then, in a case where it is determined at Step S189 that an activation instruction (or an execution instruction) is received, the control unit 101 executes the selected usage item of the non-traveling application (Step S190). In this regard, a history of the executed usage application is associated with the user ID of the passenger, and the content as illustrated in FIG. 2 described above is stored in the history memory 119.

Figure 11:
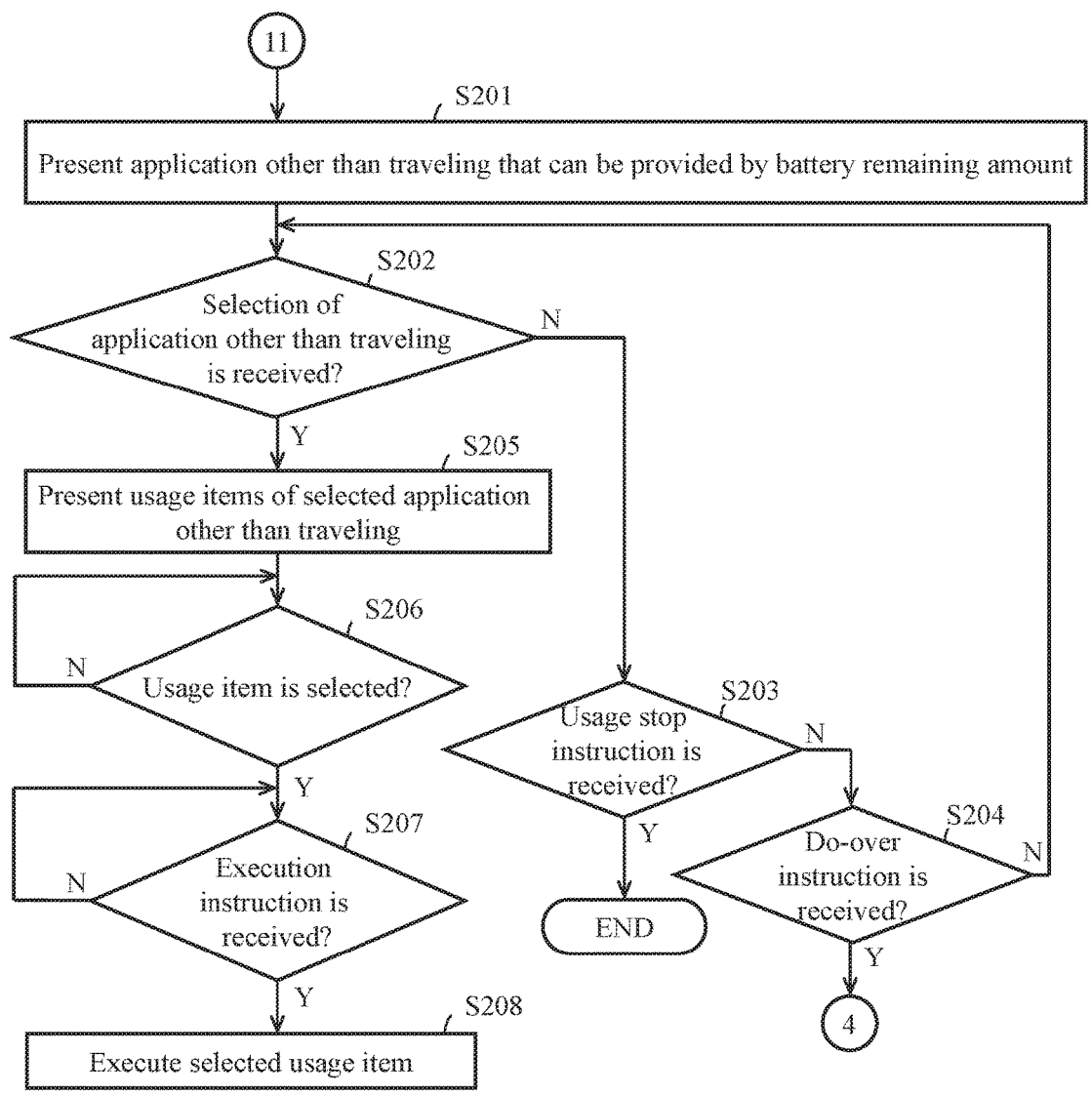
FIG. 11 is a view illustrating a flowchart for explaining a part of the flow of the example of the processing operation by the electronic control circuit unit of the automatic driving vehicle in the example of FIG. 1.
Figure 13:
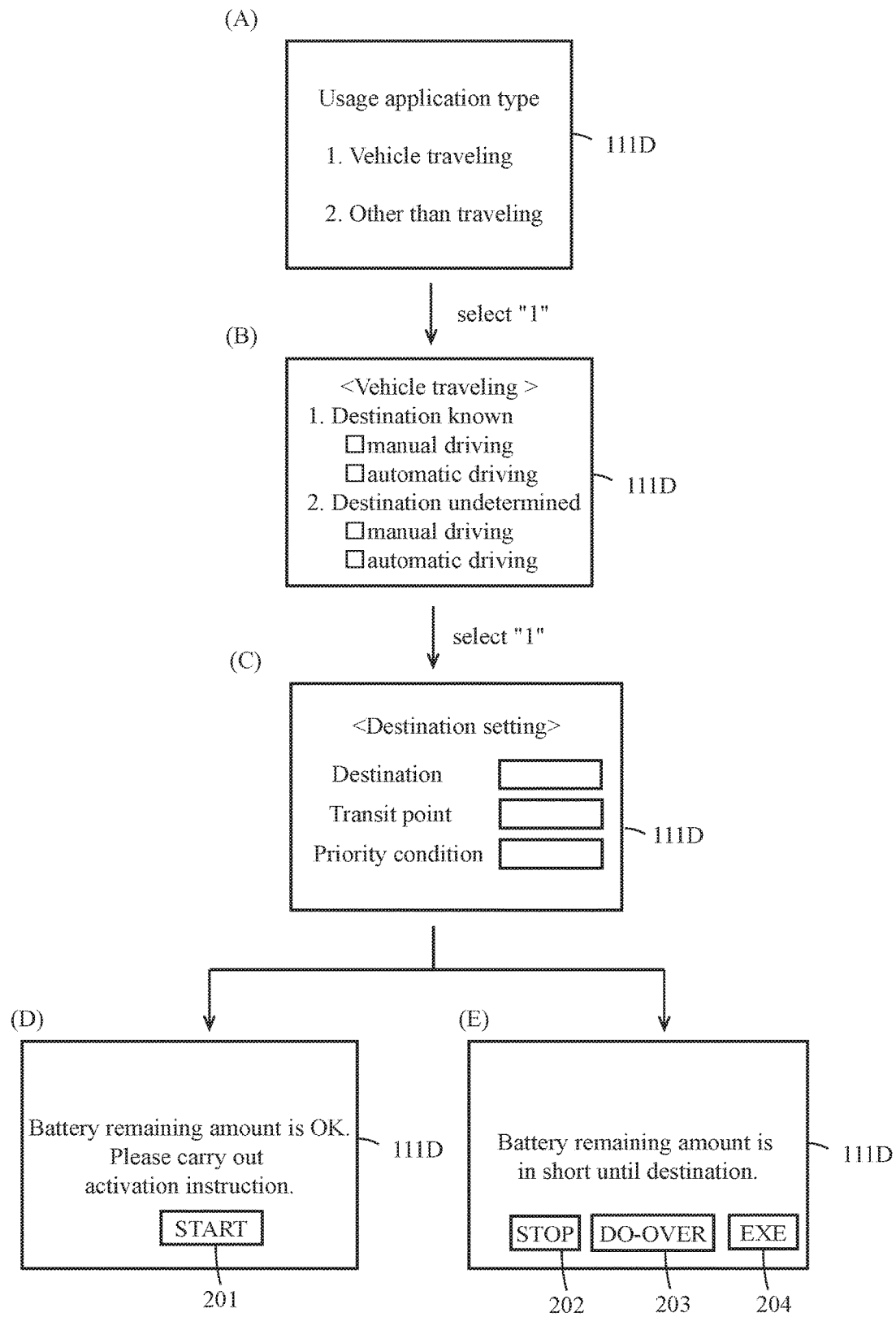
FIG. 13 is a view illustrating a display example for explaining the example of the processing operation by the electronic control circuit unit of the automatic driving vehicle in the example of FIG. 1.
Figure 14:
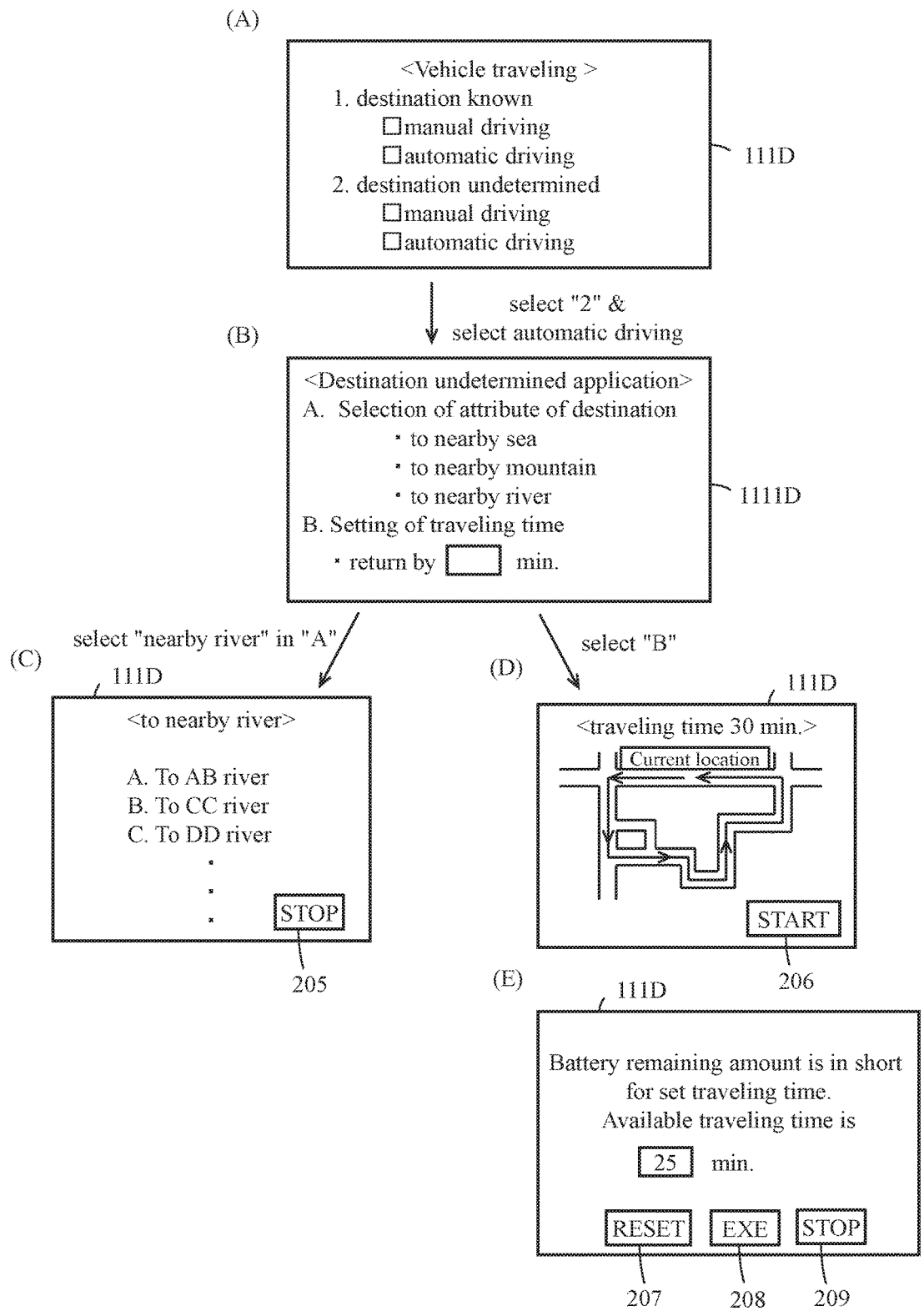
FIG. 14 is a view illustrating a display example for explaining the example of the processing operation by the electronic control circuit unit of the automatic driving vehicle in the example of FIG. 1.
Figure 15:
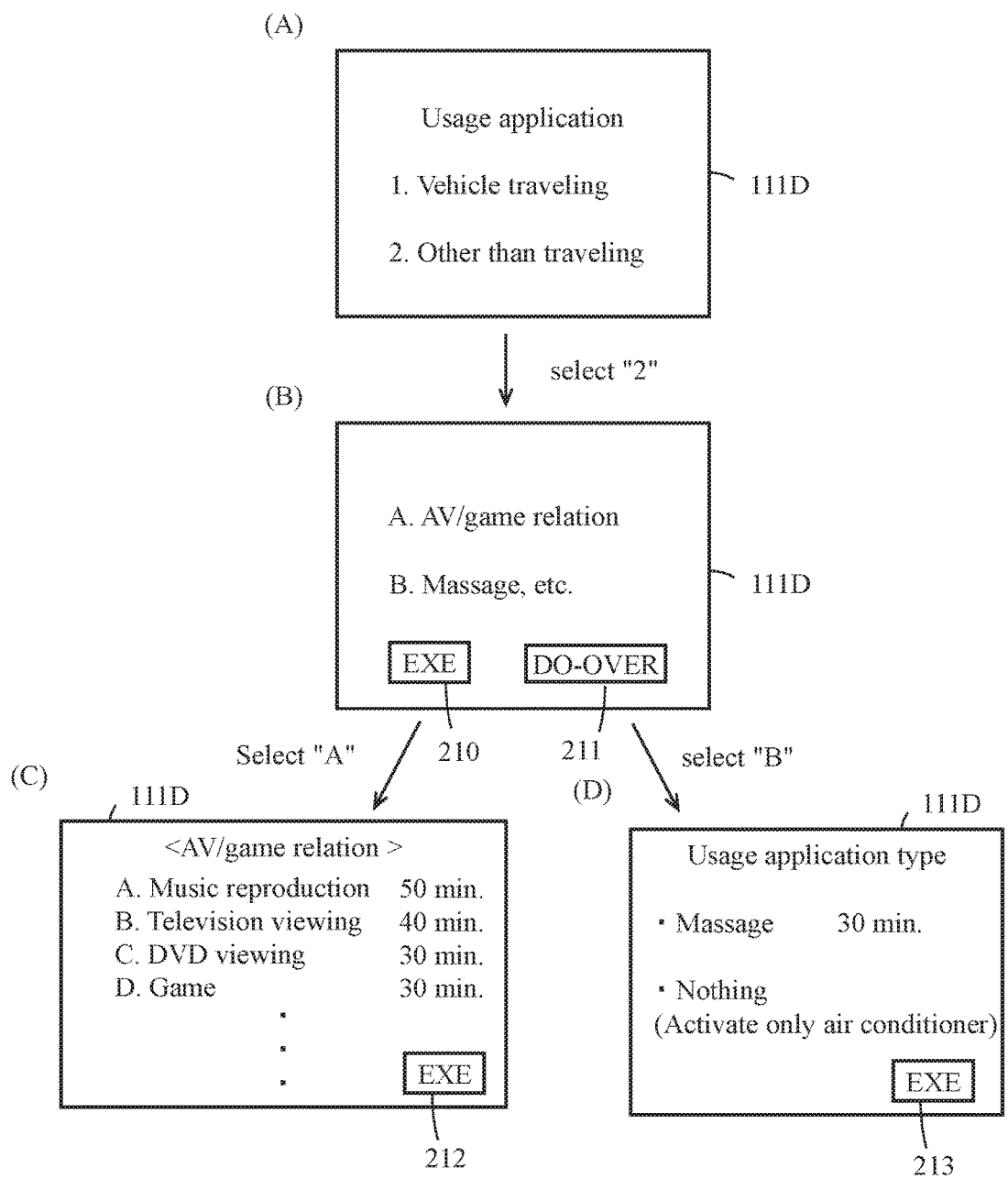
FIG. 15 is a view illustrating a display example for explaining the example of the processing operation by the electronic control circuit unit of the automatic driving vehicle in the example of FIG. 1.

Further, in a case where it is determined at Step S182 that the passenger is not any of the registered users, the control unit 101 presents the non-traveling application that can be provided by the remaining amount of the battery 11 detected at Step S181 (Step S201 in FIG. 11). In this case, since the past usage application for the passenger does not exist, the non-traveling applications are presented in an arbitrary presentation order of the priority ranking example, see FIG. 15(B)).

Next, the control unit 101 determines whether selection of a non-traveling application is received or not (Step S202). In a case where it is determined that selection of an application other than traveling is not received, the control unit 101 determines whether a usage stop instruction based on an operation against the button icon 210 (see FIG. 15(B)) on the display screen 111D through the touch panel 112 or a usage stop instruction of the automatic driving vehicle 1 by voice through the voice recognizing unit 115 is received or not (Step S203).

Then, in a case where it is determined at Step S203 that the usage stop instruction is received, the control unit 101 terminates this processing routine. Further, in a case where it is determined at Step S203 that the usage stop instruction is not received, the control unit 101 determines whether a do-over instruction based on an operation against the button icon 211 (see FIG. 15(B)) on the display screen 111D through the touch panel 112 or a do-over instruction by voice through the voice recognizing unit 115 is received or not (Step S204). Then, in a case where it is determined at Step S204 that any do-over instruction is not received, the control unit 101 causes the processing flow to return to Step S202, and repeats the processes after Step S202. Further, in a case where it is determined at Step S204 that the do-over instruction is received, the control unit 101 causes the processing flow to return to Step S111 in FIG. 4, and executes the processes after Step S111.

Next, in a case where it is determined at Step S202 that selection of a non-traveling application is received, the control unit 101 causes the display unit 111 to display the list of the usage items of the selected non-traveling application in an arbitrary order, for example, in a default order on the display screen 111D, and notifies it by voice through the speaker 135 (Step S205).

Display examples of the display screen 111D at this time are those illustrated in FIG. 15(C) and FIG. 15(D).

Next, the control unit 101 waits for selection of any usage item (Step S206). In a case where it is determined that a usage item is selected, the control unit 101 determines whether an activation instruction (or an execution instruction) based on an operation against the button icon 212 (see FIG. 15(C)) or the button icon 213 (see FIG. 15(D)) on the display screen 111D through the touch panel 112 or an activation instruction (or an execution instruction) by voice through the voice recognizing unit 115 is received or not (Step S207).

Then, in a case where it is determined at Step S207 that an activation instruction (or an execution instruction) is received, the control unit 101 executes the usage item of the selected non-traveling application (Step S208).

Effects of Embodiment

As explained above, in the invention of the automatic driving vehicle 1 according to the embodiment described above, the application for the vehicle is not limited to the traveling application. The invention considers an apparatus configured to provide non-traveling applications, and the apparatus is configured so that at timing when usage that the passenger gets into the own vehicle is to be started, whether the traveling application or the non-traveling application is to be used is inquired, and the usage application specified in accordance with the response is activated in response to the activation instruction by the passenger.

Namely, according to the automatic driving vehicle 1 of the embodiment described above, when the passenger gets into the own vehicle, the automatic driving vehicle 1 is configured to inquire the passenger of the applications including the non-traveling applications, specify the usage application of the passenger in accordance with the response to the inquiry, and execute the specified usage application. Therefore, it is possible to realize a very user-friendly vehicle for the passenger.

Moreover, according to the embodiment described above, the usage history of the own vehicle of the user registered in advance not only for the traveling application but also the non-traveling application is accumulated. Thus, it is possible to grasp the habitual usage application of the passenger, and preferentially present it to the passenger at appropriate timing. Therefore, the passenger is allowed to execute the habitual usage application in accordance with a recommendation of the automatic driving vehicle 1, whereby it is very user-friendly.

Further, according to the automatic driving vehicle 1 of the embodiment described above, the automatic driving vehicle 1 is configured to wait for the activation instruction by the passenger after the usage application is determined, and drive the determined usage application. Therefore, wasteful consumption of the driving source such as the battery can be reduced.

Further, according to the automatic driving vehicle 1 of the embodiment described above, the destination is definitely set before activation of the usage application when the traveling application is to be used. Therefore, there is no need for the passenger to carry out a procedure to set a destination after activation, and the passenger never forget the setting of the destination, whereby it is user-friendly.

Further, in a case where the destination is known on using the traveling application, the destination is definitely set before activation of the usage application not only when the automatic driving mode is selected, but also when the manual driving mode is selected. Therefore, even in a case where the driving mode is switched from the manual driving mode to the automatic driving mode in the middle of traveling, it is possible to arrive at the destination surely without the destination being unknown.

Modification of Embodiment Described Above

In this regard, in a case where it is determined at Step S114 that it is the "destination undetermined" and it is determined at Step S141 that the driving mode is the manual driving mode, the control unit 101 waits for the activation instruction by the passenger, and immediately activates the automatic driving vehicle 1. However, even in a case where it is determined at Step S114 that it is the "destination undetermined" and it is determined at Step S141 that the driving mode is the manual driving mode, before Step S142 at which the control unit 101 waits for receipt of an activation instruction, the automatic driving vehicle 1 may be configured so as to execute, in the similar manner to a case where the automatic driving mode selected at Step S141, the processes at Step S144 to Step S148 and Step S161 to Step S168, detect the remaining amount of the battery 11, and receive the attribute of the destination and settings of the traveling time.

In this regard, in the embodiment described above, a target of the habitual usage application is the application details. However, the application type and the application content may be presented to the passenger as the habitual usage application. However, in such a case, when the habitual usage application is selected, there is further need that the passenger is requested to be inquired about the application details and set them.

In this regard, in the embodiment described above, the remaining amount of the battery 11 has not been considered when the habitual usage application is executed. However, in this case, it is also of course that the remaining amount of the battery 11 may be detected, and the passenger may be notified whether a usual application can be used or not or that the remaining amount cannot be used because the remaining amount of the battery 11 is in short.

In the embodiment described above, in a case where the remaining amount of the battery 11 is in short, the passenger has been informed of only that effect. However, in a case where a non-traveling application that can be used during stoppage of a vehicle is used, the passenger may be proposed so as to use the application while charging the battery 11.

In this regard, in the embodiment described above, the automatic driving vehicle 1 has been configured to receive the activation instruction by the passenger after the usage application is determined. However, it is also possible to determine the usage application after the activation instruction by the passenger.

Other Embodiment or Other Modification Example

In this regard, it goes without saying that the non-traveling application is not limited to the examples according to the embodiment described above. Further, the automatic driving vehicle 1 may of course be configured so that the passenger is allowed to select and activate the non-traveling application while the automatic driving vehicle 1 is traveling in accordance with the traveling application.

Further, the automatic driving vehicle 1 may propose a recommended application among the traveling application and the non-traveling applications in accordance with the remaining amount of the battery 11. Further, the automatic driving vehicle 1 may be configured to present a recommended traveling route in accordance with the remaining amount of the battery 11 as the traveling application.

Further, in the embodiment described above, the passenger selects specific one as the non-traveling application. However, the automatic driving vehicle 1 may be allowed to use items of a plurality of non-traveling applications such as listening of music while the passenger is massaged, or playing of a game while listening to music at the same time. In that case, a dedicated selection button for selecting the items of the plurality of non-traveling applications at the same time may be provided. Further, the automatic driving vehicle 1 may be allowed to select the items of the plurality of non-traveling applications by using voice through the voice recognizing unit 115 on a conversation basis (or on an interactive basis).

In this regard, in the embodiment described above, in a case where "2. Other than traveling" is selected as the usage application via the inquiry screen for the usage application illustrated in FIG. 15(A), the screen is changed into the list screen for the non-traveling applications illustrated in FIG. 15(B). However, even in a case where "1. Vehicle traveling" is selected, the screen may be changed into the list screen for the non-traveling applications illustrated in FIG. 15(B). However, in this case, in addition to "A. AV/game relation" and "B. Massage, etc.", "C. Only vehicle traveling" that does not require the non-traveling application is added thereto. Of course, the list screen for the non-traveling applications is not limited to this, and may be rest relation such as sleeping, dietary relation, reading relation, work and study relation, and the like.

Further, contrary to the above, the automatic driving vehicle 1 may be configured to first present the list screen for the non-traveling applications, and then cause the passenger to select whether the automatic driving vehicle 1 is caused to travel or not.

In the embodiment described above, the attribute of the passenger has not been considered. However, personal attributes of the passenger such as age, gender, or nationality may be stored so as to be associated with the user ID, and as the non-traveling application, the application to be presented and items of the application content may be variable in accordance with the personal attributes of the passenger such as age, gender, or nationality. For example, massage is necessary for aged persons, but is hardly necessary for school child or young people. Therefore, the age becomes an important factor. Whether "adult only" is designated or not when a DVD or a BD is viewed also depends upon the age. Further, since a preference of the AV/game relation largely varies depending upon the gender, it is possible to change the genre of the presentation content depending upon the gender.

In the embodiment described above, there is no manual for a makeup application. However, of course, there may be the makeup application. The makeup application is entirely a choice for females. However, in case of the makeup application, the display unit 111 is configured by a mirror display, and the display screen is exchanged into a mirror surface to be used for makeup. Further, the nationality particularly influences an application with a language dependency, effects such as caption or dubbing are exerted to reproduce a DVD or a BD. The personal attributes of the passenger such as age, gender, or nationality are stored as the user ID, or so as be associated with the user ID. Of course, the personal attributes are not limited to age, gender, and nationality, and may be religion, a residential area or hometown, an occupation, a hobby, or the like.

Further, in the embodiment described above, the non-traveling application is not changed on the basis of the number of passengers. However, for example, in case of a game, a fighting game such as Japanese chess, game of go, or chess cannot be played unless there are two persons. Mah-jong cannot be played unless there are four persons. Since there are applications each of which depends on the number of passengers, the number of passengers may be counted up, and the content thereof to be presented may be changed. In a case where the number of passengers is initially three and then becomes four by increasing one passenger from the middle, mah-jong is added as an application at that time.

For example, at least one of the number of passengers who get into the own vehicle or composition of the passengers may be detected from a shot image of the camera among the group of cameras 107. The application to be presented and the items of the application content may be variable on the basis of whether the detected number or composition of the passengers is one or a couple, the same gender friends, a group of three or more persons, or a family, for example.

For example, when the detected number or composition of the passengers includes a passenger who holds a crying baby, for example, a destination undetermined application with a predetermined traveling time is inquired in order to stop the baby from crying. In a case where a family gets into the vehicle, an inquiry about the traveling application, and particular, the destination known application is mainly made.

In this regard, in order to detect at least one of the number of passengers who get into the own vehicle or composition of the passengers, in addition to the shot image of the camera, the voice of the passenger collected through the microphone 136, an opening/closing sensor for each of doors of the own vehicle (including a driver's seat side door, a front passenger seat side door, a rear passenger seat side door), a seating sensor provided on each seat, and the like may be used.

The vehicle according to the embodiment described above is an example of the electric vehicle, and only the battery is provided as the driving source. However, in case of a gasoline engine vehicle or a diesel engine vehicle, the driving source is not only the battery, but also is provided by gasoline or light gas oil. In such a case, in case of the traveling application, a target detected as the remaining amount is not only the remaining amount of the battery 11, and a remaining amount of fuel such as gasoline or light gas oil is of course considered. Further, the vehicle according to this invention may be a fuel cell vehicle or the like.

The case where the vehicle according to the embodiment described above is the automatic driving vehicle capable of autonomous traveling has been described. However, it goes without saying that even though the vehicle is a vehicle having only a manual driving mode or a vehicle on which the manual driving mode and a mode capable of specific automatic driving such as automatic tracking are mounted, this invention can be applied thereto.

Moreover, even though the vehicle according to the embodiment described above is not only a standard-sized vehicle or a light motor vehicle, but also a motortruck, a bus, a taxi, a vehicle for one person, or the like, this invention can be applied thereto. Of course, the vehicle according to the embodiment described above may be an amphibious vehicle or a roadable aircraft (or a flying vehicle). In case of the amphibious vehicle or the roadable aircraft (or the flying vehicle), a navigational application is added in addition to the traveling application. Moreover, underwater shooting or aerial shooting can be selected as the application other than the traveling application and the navigational application.

In this regard, the vehicle according to the embodiment described above may inform, by display and voice, the outside of providing application information on whether the own vehicle is providing the traveling application or the non-traveling application. In such a case, the vehicle includes a display unit in a door that can be visually recognized from the outside, or a speaker configured to output voice to the outside. Further, the vehicle may transmit, by using wireless communication, the providing application information to other vehicles that is traveling, stopping or parking around the vehicle, or may transmit it to surrounding smartphones. In such a case, the vehicle includes means for wireless communication with the other neighboring vehicles or the surrounding smartphone. Moreover, the providing application information may be uploaded to a cloud through the wireless communication unit 124. Because of information or transmission of the providing application information, the outside recognizes that the vehicle does not travel while the non-traveling application is being provided. Therefore, there is an effect that it is possible to determine safety of the vehicle without worrying about sudden starting or the like.

Further, the vehicle according to the embodiment described above is configured to include a function to receive, through the wireless communication unit 124, emergency disaster reports such as an emergency earthquake report (flash report), tsunami advisory or tsunami warning, flood advisory or warning of a river, advisory or warning of a landslide, or advisory or warning of eruption of a volcano. This makes it possible to address an emergency disaster application. In this case, in a case where an emergency disaster report is received, the emergency disaster application takes precedence over the usage applications for the own vehicle including the traveling application of the own vehicle and the non-traveling applications. In case of the emergency disaster application, the vehicle determines, as the application, whether the inside of the own vehicle is secure or not, whether the vehicle has to be caused to travel or not, and where and how the vehicle has to be caused to travel if traveling. Then, in a case where the vehicle is the automatic driving vehicle, the vehicle selects and executes the determined application by oneself, and presents it to the passenger. In a case where the vehicle is not the automatic driving vehicle and includes only the manual driving mode, the vehicle presents the determined application to the passenger. In a case where the vehicle travels, the vehicle guides the traveling by driving of the passenger by using the car-navi function. This is implemented not only when the passenger gets into the vehicle, but also after the passenger gets into the vehicle in the form of interruption of the executing application.

In this regard, for example, in case of the emergency earthquake report, in the emergency disaster application, the vehicle selects and executes, as the traveling application, not traveling (or not starting), or lighting of the hazard lamp and moving and parking to shoulder of the road (in case of the automatic driving vehicle), or guidance in such a manner (in case of the manual driving vehicle). Further, in case of the tsunami warning, the vehicle selects and executes an application that causes the vehicle to travel by setting a safe location against tsunami such as a hill as a destination by the car-navi functioning unit 113 (in case of the automatic driving vehicle), or guides the passenger so as to do so (in case of the manual driving vehicle). Moreover, in case of warning of the landslide or the eruption of a volcano, the vehicle selects and executes an application that causes the vehicle to travel by setting a safe location that a debris flow, a pyroclastic flow, or volcano dust spreads as a destination by the car-navi functioning unit 113 (in case of the automatic driving vehicle), or guides the passenger so as to do so (in case of the manual driving vehicle).

As the non-traveling application in the emergency disaster application, the vehicle selects and executes an application that causes the passenger to view television broadcast regarding the emergency disaster by the television broadcast receiving functioning unit, for example, in accordance with the received content of the emergency disaster report, or to listen to radio broadcast regarding the emergency disaster by the AM and FM radio broadcast receiving functioning unit.

Of course, in case of the disaster, in addition to the emergency disaster, in a case where disaster or damage continuously occurs for many days such as typhoon, eruption of a volcano, or a forest fire, it is also possible to address it in the similar manner to the emergency disaster application.

Further, in a case where advisory or warning of air pollution such as urban ozone, yellow dust, or PM2.5 is received through the wireless communication unit 124, the vehicle selects and executes the traveling application or the non-traveling application in the similar manner to that according to the embodiment described above. However, in order to avoid damage by air pollution, the vehicle prohibits an application that requires to open the window, closes the opened window, and prevent the window from being opened. This becomes the similar handling even against a sandstorm or a dust storm. However, even though the vehicle is not provided with the wireless communication unit 124, it is possible to determine it by image recognition from the group of cameras 107. Even in case of heavy air pollution such as yellow dust, it is also similarly possible to determine it by image recognition from the group of cameras 107.

EXPLANATION OF SYMBOLS

1 . . . automatic driving vehicle, 10 . . . electronic control circuit unit, 11 . . . battery, 101 . . . control unit, 102 . . . motor driving control unit, 104 . . . manual/automatic driving mode switching control unit, 107 . . . group of cameras, 108 . . . group of sensors, 110 . . . current location detecting unit, 111 . . . display unit, 111D . . . display screen, 112 . . . touch panel, 113 . . . car-navi(car navigation) functioning unit, 114 . . . image recognizing unit, 115 . . . voice recognizing unit, 116 . . . application navigation functioning unit, 117 . . . AV entertainment functioning unit, 118 . . . massage mechanism driving unit, 119 . . . history memory, 120 . . . history analyzing unit, 121 . . . voice input/output unit, 122 . . . clock unit, 123 . . . battery remaining amount detecting unit, 134 . . . user image information storing unit, 135 . . . speaker, 136 . . . microphone

The invention claimed is:

1. A vehicle comprising:
at least one of a motor, at least one battery, or a fuel cell configured to execute traveling of an own vehicle; and
a controller configured to execute a traveling application in which the traveling of the own vehicle is caused by the at least one of the motor, the at least one battery, or the fuel cell and a non-traveling application in which a passenger is provided with an application other than the traveling of the own vehicle, wherein the controller is further configured to:
- determine a priority ranking for each of a plurality of usage items that correspond to the non-traveling application based on usage data;
- inquire a usage application of the own vehicle to the passenger when the passenger gets into the own vehicle, the usage application including the traveling application and the application other than the traveling of the own vehicle;
- activate the non-traveling application in a case where the application other than the traveling is selected in response to the inquiry by the controller and present the plurality of usage items that correspond to the non-traveling application to the passenger based on the determined priority ranking, wherein the presenting the plurality of usage items that correspond to the non-traveling application including a visual presentation and an audible presentation and information that indicates an amount of time that is usable by a remaining amount of the at least one battery with respect to the non-traveling application; and
- activate the at least one of the motor, the at least one battery, or the fuel cell in a case where the traveling application is selected in response to the inquiry by the controller, wherein the controller is further configured to inquire the passenger whether a destination is decided or not, and obtain information on the destination in a case where a response that the destination is decided is obtained,
- in response to the destination is not defined by the passenger, the controller further configured to inquire a designation for a traveling time or a traveling end time to be received from the passenger,
- in response to the designation for the traveling time or the traveling end time is received, the controller further configured to calculate a travelable time based on the remaining amount of the battery and notify the passenger, through a display of the vehicle, a warning message in a case the travelable time is shorter than the received traveling time or the traveling end time;

the vehicle further comprising a wireless interface, wherein in a case where the wireless interface receives an emergency disaster report, an emergency disaster application is selected as the usage application of the own vehicle, the emergency disaster report including a flood advisory or warning of a river, a landslide advisory or warning of a landslide, or an eruption advisory or warning of a volcano.

2. The vehicle according to claim 1, further comprising:
the at least one battery configured to drive at least the non-traveling-application;
the controller further configured to detect a remaining amount of the at least one battery; and
a plurality of the non-traveling-application configured to receive electric power supply from the at least one battery, wherein only the non-traveling-application, which is allowed to be provided with the remaining amount of the at least one battery detected by the controller, is presented in response to the inquiry by the controller.

3. The vehicle according to claim 1, further comprising:
the at least one battery configured to drive at least the non-traveling-application; and the controller further configured to detect a remaining amount of the at least one battery, wherein the non-traveling-application is configured to receive electric power supply from the at least one battery, and wherein the inquiry by the controller includes an available time of the non-traveling-application based on the remaining amount of the at least one battery detected by the controller.

4. The vehicle according to claim 1, further comprising:
a plurality of the non-traveling-application; and
a memory configured to store a usage history of each of the plurality of the non-traveling-application, wherein the plurality of the non-traveling-application is presented with a presentation mode based on the usage history of the memory in response to the inquiry by the controller.

5. The vehicle according to claim 4, further comprising:
a camera configured to identify the passenger, wherein the usage history is stored for each of passengers identified by the camera in the memory, and wherein the plurality of the non-traveling-application is presented with the presentation mode based on the usage history of the memory for an identified passenger in response to the inquiry by the controller.

6. The vehicle according to claim 4, wherein at least one of a date, a day of week, or a time when the non-traveling-application is used is also stored in the memory, and
wherein the controller:
- refers to the memory on a basis of the at least one of the date, the day of week, or the time when the inquiry is executed;
- detects a habitual usage application related to the at least one of the date, the day of week, or the time when the inquiry is executed as the presentation mode based on the usage history; and
- is associated with presentation by the non-traveling-application by using a detection result, the presentation being recommended in the at least one of the date, the day of week, or the time when the inquiry is executed.

7. The vehicle according to claim 1, further comprising:
a camera configured to identify the passenger; and
a memory configured to store attribute information of the passenger associated with identification information of the passenger, wherein the controller obtains, from the memory, the attribute information of the passenger identified by the camera to execute presentation of the non-traveling-application in accordance with the obtained attribute information, the presentation to be recommended.

8. The vehicle according to claim 1, wherein the vehicle is provided with an automatic driving mode in which autonomous traveling is carried out, wherein the controller is further:
configured to wait for an activation instruction from the passenger to activate the at least one of the motor, the at least one battery, or the fuel cell after the controller obtains the destination.

9. The vehicle according to claim 8, further comprising:
a camera configured to identify the passenger, wherein the usage history of the traveling application is stored for each of passengers identified by the camera in the memory, and
wherein the controller is further configured to present, on the display, a destination as a destination candidate in a case where the traveling application is selected in response to the inquiry by the controller, the destination being selected based on the usage history of the memory for the passenger.

10. The vehicle according to claim 1, further comprising:
a memory configured to store a usage history of the traveling application; and
wherein the controller is further configured to present, on the display as a destination candidate, a destination selected based on the usage history of the memory in a case where the traveling application is selected in response to the inquiry by the controller.

11. The vehicle according to claim 10, wherein at least one of a date, a day of week, or a time when the traveling application is used is also stored in the memory, and
wherein the controller:
refers to the memory on a basis of the at least one of the date, the day of week, or the time when the inquiry is executed;
detects, as a presentation mode based on the usage history, a habitual usage application related to the at least one of the date, the day of week, or the time when the inquiry is executed; and
executes presentation of the traveling application by using a detection result, the presentation being recommended in the at least one of the date, the day of week, or the time when the inquiry is executed.

12. The vehicle according to claim 1, further comprising:
a display for presenting a list of location attributes in a case where a response that the destination is not defined is obtained, the location attributes becoming candidates of the destination.

13. The vehicle according to claim 1, further comprising:
a microphone for detecting at least one of a number of passengers or a constitution of passengers, wherein the controller executes the inquiry about the usage application of the own vehicle in accordance with the at least one of the number of passengers or the constitution of passengers.

14. The vehicle according to claim 1, wherein
the controller is further configured to inform an outside whether the own vehicle is providing the traveling application or the non-traveling application.

15. A non-transitory computer-readable medium including a program for a vehicle, the vehicle comprising:
at least one of a motor, at least one battery, or a fuel cell configured to execute traveling of an own vehicle;
a controller configured to execute a traveling application in which traveling of the own vehicle is caused by the at least one of the motor, the at least one battery, or the fuel cell and a non-traveling application in which a passenger is provided with an application other than the traveling of the own vehicle; the program causing the controller to:
determine a priority ranking for each of a plurality of usage items that correspond to the non-traveling application based on usage data;
inquire a usage application of the own vehicle to the passenger when the passenger gets into the own vehicle, the usage application including the traveling application and the application other than the traveling of the own vehicle;
activate the non-traveling application in a case where the application other than the traveling is selected in response to the inquiry by the controller and present the plurality of usage items that correspond to the non-traveling application to the passenger based on the determined priority ranking, wherein the presenting the plurality of usage items that correspond to the non-traveling application including a visual presentation and an audible presentation and information that indicates an amount of time that is usable by a remaining amount of the at least one battery with respect to the non-traveling application; and
activate the at least one of the motor, the at least one battery, or the fuel cell in a case where the traveling application is selected in response to the inquiry by the controller, wherein the controller is further configured to inquire the passenger whether a destination is decided or not, and obtain information on the destination in a case where a response that the destination is decided is obtained,
in response to the destination is not defined by the passenger, the controller further configured to inquire a designation for a traveling time or a traveling end time,
in response to the designation for the traveling time or the traveling end time is received, the controller further configured to calculate a travelable time based on the remaining amount of the battery and notify the passenger, through a display of the vehicle, a warning message in a case the travelable time is shorter than the received traveling time or the traveling end time;
the vehicle further comprising a wireless interface, wherein in a case where the wireless interface receives an emergency disaster report, an emergency disaster application is selected as the usage application of the own vehicle, the emergency disaster report including a flood advisory or warning of a river, a landslide advisory or warning of a landslide, or an eruption advisory or warning of a volcano.

16. The non-transitory computer-readable medium according to claim 15, wherein the vehicle includes an automatic driving mode for executing autonomous traveling, wherein the program further causes the controller to
wait for an activation instruction from the passenger to activate the at least one of the motor, the at least one battery, or the fuel cell after the destination is obtained by the controller.

* * * * *